United States Patent
Liu et al.

(10) Patent No.: US 11,501,317 B2
(45) Date of Patent: Nov. 15, 2022

(54) METHODS, APPARATUSES, AND DEVICES FOR GENERATING DIGITAL DOCUMENT OF TITLE

(71) Applicant: ALIPAY (HANGZHOU) INFORMATION TECHNOLOGY CO., LTD., Zhejiang (CN)

(72) Inventors: Wenhui Liu, Hangzhou (CN); Erfeng Yan, Hangzhou (CN)

(73) Assignee: Alipay (Hangzhou) Information Technology Co., Ltd., Zhejiang (CN)

(*) Notice: Subject to any disclaimer, the term of this patent is extended or adjusted under 35 U.S.C. 154(b) by 0 days.

(21) Appl. No.: 17/244,600

(22) Filed: Apr. 29, 2021

(65) Prior Publication Data
US 2021/0248622 A1 Aug. 12, 2021

(30) Foreign Application Priority Data
Jul. 31, 2020 (CN) .......................... 202010757352.7

(51) Int. Cl.
*G06Q 30/00* (2012.01)
*G06F 16/93* (2019.01)
(Continued)

(52) U.S. Cl.
CPC ..... *G06Q 30/018* (2013.01); *G06F 16/90335* (2019.01); *G06F 16/93* (2019.01);
(Continued)

(58) Field of Classification Search
CPC ...... G06Q 30/018; G06Q 10/10; G06F 16/93; G06F 16/90335; G06F 21/602
See application file for complete search history.

(56) References Cited

U.S. PATENT DOCUMENTS 11,063,770 B1* 7/2021 Peng ................... H04L 9/3247
2018/0268506 A1* 9/2018 Wodetzki ............... G06K 9/628
(Continued)

FOREIGN PATENT DOCUMENTS

CN 106815764 6/2017
CN 108416675 8/2018
(Continued)

OTHER PUBLICATIONS

Baldi et al. (Security analysis of a blockchain-based protocol for the certification of academic credentials, arXiv:1910.04622v1 [cs.CR] Oct. 10, 2019, 12 pages) (Year: 2019).*
(Continued)

*Primary Examiner* — Oleg Korsak
(74) *Attorney, Agent, or Firm* — Fish & Richardson P.C.

(57) ABSTRACT

A service node receives a document creation request sent by a first user for creating a digital document of title of a target asset. The document creation request includes first configuration information of a digital document of title to be created. The first configuration information is generated by the first user by performing a configuration operation on each component in a corresponding first document template based on related information of the target asset. The first document template is a template that matches the related information of the target asset in a plurality of document templates corresponding to a first blockchain. A digital document of title is generated based on the first configuration information and a predetermined document generation rule, and stored in the first blockchain, so the target asset is circulated by using the first blockchain based on the digital document of title.

12 Claims, 18 Drawing Sheets

(51) Int. Cl.

| | | |
|---|---|---|
| *G06F 16/903* | (2019.01) | |
| *G06F 21/60* | (2013.01) | |
| *G06Q 10/10* | (2012.01) | |
| G06F 16/182 | (2019.01) | |
| G06F 3/12 | (2006.01) | |
| G06F 21/00 | (2013.01) | |
| G06Q 20/38 | (2012.01) | |
| G06Q 50/28 | (2012.01) | |

(52) U.S. Cl.
CPC ........... *G06F 21/602* (2013.01); *G06Q 10/10* (2013.01); *G06F 3/1242* (2013.01); *G06F 16/182* (2019.01); *G06F 21/00* (2013.01); *G06Q 20/389* (2013.01); *G06Q 50/28* (2013.01); *G06Q 2220/10* (2013.01)

(56) References Cited

U.S. PATENT DOCUMENTS

| | | | |
|---|---|---|---|
| 2018/0365201 A1* | 12/2018 | Hunn | H04L 9/3239 |
| 2019/0013932 A1* | 1/2019 | Maino | G06N 20/00 |
| 2019/0279204 A1 | 9/2019 | Norton et al. | |
| 2019/0340013 A1* | 11/2019 | Cella | G06Q 20/308 |
| 2019/0361917 A1* | 11/2019 | Tran | G06F 16/28 |
| 2020/0034453 A1* | 1/2020 | Sato | H04L 63/123 |
| 2020/0104296 A1* | 4/2020 | Hunn | G06F 16/2379 |
| 2020/0175206 A1* | 6/2020 | Brannon | G06F 21/604 |
| 2020/0234351 A1* | 7/2020 | Qing | G06F 16/26 |
| 2020/0349561 A1* | 11/2020 | Kuchkovsky Jimenez | G06F 16/2365 |
| 2020/0349663 A1* | 11/2020 | Quadras | G06Q 40/02 |
| 2020/0356697 A1* | 11/2020 | Brannon | G06F 21/6245 |
| 2021/0166326 A1* | 6/2021 | Wang | H04L 9/3239 |
| 2021/0192082 A1* | 6/2021 | Jones | G06F 21/6272 |

FOREIGN PATENT DOCUMENTS

| | | |
|---|---|---|
| CN | 110222077 | 9/2019 |
| CN | 110910066 | 3/2020 |
| CN | 110969531 | 4/2020 |
| CN | 111401895 | 7/2020 |
| CN | 111461623 | 7/2020 |
| CN | 111738737 | 10/2020 |
| EP | 3396575 | 10/2018 |
| KR | 20200080846 | 7/2020 |
| WO | WO 2019228563 | 12/2019 |

OTHER PUBLICATIONS

Hardwick (Ecommerce SEO: A Simple (But Complete) Guide, Jun. 28, 2018, 48 pages) (Year: 2018).*

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

Extended European Search Report in European Application No. 21171429.0, dated Nov. 22, 2021, 11 pages.

PCT International Search Report and Written Opinion in International Application No. PCT/CN2021/104884, dated Oct. 12, 2021, 9 pages (with partial English translation).

* cited by examiner

```
┌─────────────────────────────────────────────────────────────────────┐
│ Obtain first configuration information of a digital document of title to be created in response │─S202
│ to a creation operation performed by a first user to create a digital document of title of a     │
│ target asset, where the first configuration information is configuration information             │
│ generated by the first user by performing a configuration operation on each component in         │
│ a corresponding first document template based on related information of the target asset,        │
│ and the first document template is a template that matches the related information of the       │
│ target asset in a plurality of document templates corresponding to a first blockchain            │
└─────────────────────────────────────────────────────────────────────┘
                                        ↓
┌─────────────────────────────────────────────────────────────────────┐
│ If it is determined that the first configuration information satisfies a configured first        │─S204
│ configuration rule of the component, send a document creation request to a service node          │
│ based on the first configuration information, so the service node generates a digital            │
│ document of title based on the first configuration information and a predetermined               │
│ document generation rule, and stores the digital document of title in the first blockchain,      │
│ so the target asset is circulated by using the first blockchain based on                         │
│ the digital document of title                                                                    │
└─────────────────────────────────────────────────────────────────────┘
                                        ↓
┌─────────────────────────────────────────────────────────────────────┐
│ Display received creation result information sent by the service node                            │─S206
└─────────────────────────────────────────────────────────────────────┘
                                        ↓
┌─────────────────────────────────────────────────────────────────────┐
│ Send a document query request to the service node in response to a document query                │─S208
│ operation of the first user, where the document query request includes document                  │
│ identification information of a digital document of title to be queried, so the service node     │
│ queries the associated digital document of title and the first configuration information from    │
│ the first blockchain based on the document identification information, to generate               │
│ re-direction information of a display interface of the first configuration information           │
└─────────────────────────────────────────────────────────────────────┘
                                        ↓
┌─────────────────────────────────────────────────────────────────────┐
│ Display the received digital document of title and re-direction information                      │─S210
│ sent by the service node                                                                         │
└─────────────────────────────────────────────────────────────────────┘
                                        ↓
┌─────────────────────────────────────────────────────────────────────┐
│ If a trigger operation of the re-direction information is detected, re-direct to a corresponding │─S212
│ display interface to display the first configuration information associated                      │
│ with the digital document of title                                                               │
└─────────────────────────────────────────────────────────────────────┘
```

FIG. 15

METHODS, APPARATUSES, AND DEVICES FOR GENERATING DIGITAL DOCUMENT OF TITLE

CROSS-REFERENCE TO RELATED APPLICATIONS

This application claims priority to Chinese Patent Application No. 202010757352.7, filed on Jul. 31, 2020, which is hereby incorporated by reference in its entirety.

TECHNICAL FIELD

The present specification relates to the field of computer technologies, and in particular, to methods, apparatuses, and devices for generating a digital document of title.

BACKGROUND

A blockchain is a chain-type data structure obtained by combining data blocks in chronological order, and uses a cryptology method to ensure that a distributed ledger cannot be tampered with or forged. In recent years, blockchains have been applied in many fields. A typical application is a bitcoin transaction based on a blockchain. However, assets of a user often include not only bitcoins, but also other assets. How to enable these assets to participate in a blockchain transaction is a problem that needs to be solved.

SUMMARY

One or more embodiments of the present specification provide a method for generating a digital document of title, applied to a service node. The method includes the following: A document creation request sent by a first user for creating a digital document of title of a target asset is received, where the document creation request includes first configuration information of a digital document of title to be created, the first configuration information is configuration information generated by the first user by performing a configuration operation on each component in a corresponding first document template based on related information of the target asset, and the first document template is a template that matches the related information of the target asset in a plurality of document templates corresponding to a first blockchain; a digital document of title is generated based on the first configuration information and a predetermined document generation rule; and the digital document of title is stored in the first blockchain, so the target asset is circulated by using the first blockchain based on the digital document of title.

One or more embodiments of the present specification provide a method for generating a digital document of title, applied to a client device. The method includes the following: First configuration information of a digital document of title to be created is obtained in response to a creation operation performed by a first user to create a digital document of title of a target asset, where the first configuration information is configuration information generated by the first user by performing a configuration operation on each component in a corresponding first document template based on related information of the target asset, and the first document template is a template that matches the related information of the target asset in a plurality of document templates corresponding to a first blockchain; and if it is determined that the first configuration information satisfies a configured first configuration rule of the component, a document creation request is sent to a service node based on the first configuration information, so the service node generates a digital document of title based on the first configuration information and a predetermined document generation rule, and stores the digital document of title in the first blockchain, so the target asset is circulated by using the first blockchain based on the digital document of title.

One or more embodiments of the present specification provide an apparatus for generating a digital document of title, applied to a service node. The apparatus includes a receiving module, configured to receive a document creation request sent by a client device of a first user for creating a digital document of title of a target asset, where the document creation request includes first configuration information of a digital document of title to be created, the first configuration information is configuration information generated by the first user by performing a configuration operation on each component in a corresponding first document template based on related information of the target asset, and the first document template is a template that matches the related information of the target asset in a plurality of document templates corresponding to a first blockchain. The apparatus further includes a generation module, configured to generate a digital document of title based on the first configuration information and a predetermined document generation rule. The apparatus further includes a storage module, configured to store the digital document of title in the first blockchain, so the target asset is circulated by using the first blockchain based on the digital document of title.

One or more embodiments of the present specification provide an apparatus for generating a digital document of title, applied to a client device. The apparatus includes: a first acquisition module, configured to obtain first configuration information of a digital document of title to be created in response to a creation operation performed by a first user to create a digital document of title of a target asset, where the first configuration information is configuration information generated by the first user by performing a configuration operation on each component in a corresponding first document template based on related information of the target asset, and the first document template is a template that matches the related information of the target asset in a plurality of document templates corresponding to a first blockchain; and a sending module, configured to: if it is determined that the first configuration information satisfies a configured first configuration rule of the component, send a document creation request to a service node based on the first configuration information, so the service node generates a digital document of title based on the first configuration information and a predetermined document generation rule, and stores the digital document of title in the first blockchain, so the target asset is circulated by using the first blockchain based on the digital document of title. The apparatus further includes a receiving module, configured to receive creation result information sent by the service node.

One or more embodiments of the present specification provide a device for generating a digital document of title. The device includes a processor. The device further includes a memory arranged to store computer executable instructions. When the computer executable instructions are executed, the processor is enabled to receive a document creation request sent by a first user for creating a digital document of title of a target asset, where the document creation request includes first configuration information of a digital document of title to be created, the first configuration information is configuration information generated by the first user by performing a configuration operation on each component in a corresponding first document template based on related information of the target asset, and the first document template is a template that matches the related information of the target asset in a plurality of document templates corresponding to a first blockchain; and generate a digital document of title based on the first configuration information and a predetermined document generation rule; and store the digital document of title in the first blockchain, so the target asset is circulated by using the first blockchain based on the digital document of title.

One or more embodiments of the present specification provide a device for generating a digital document of title. The device includes a processor. The device further includes a memory arranged to store computer executable instructions. When the computer executable instructions are executed, the processor is enabled to obtain first configuration information of a digital document of title to be created in response to a creation operation performed by a first user to create a digital document of title of a target asset, where the first configuration information is configuration information generated by the first user by performing a configuration operation on each component in a corresponding first document template based on related information of the target asset, and the first document template is a template that matches the related information of the target asset in a plurality of document templates corresponding to a first blockchain; if it is determined that the first configuration information satisfies a configured first configuration rule of the component, send a document creation request to a service node based on the first configuration information, so the service node generates a digital document of title based on the first configuration information and a predetermined document generation rule, and stores the digital document of title in the first blockchain, so the target asset is circulated by using the first blockchain based on the digital document of title; and display received creation result information sent by the service node.

One or more embodiments of the present specification provide a storage medium, configured to store computer executable instructions, where the computer executable instructions receive, when executed by a processor, a document creation request sent by a first user for creating a digital document of title of a target asset, where the document creation request includes first configuration information of a digital document of title to be created, the first configuration information is configuration information generated by the first user by performing a configuration operation on each component in a corresponding first document template based on related information of the target asset, and the first document template is a template that matches the related information of the target asset in a plurality of document templates corresponding to a first blockchain; generate a digital document of title based on the first configuration information and a predetermined document generation rule; and store the digital document of title in the first blockchain, so the target asset is circulated by using the first blockchain based on the digital document of title.

One or more embodiments of the present specification provide a storage medium, configured to store computer executable instructions, where when being executed, the computer executable instructions obtain first configuration information of a digital document of title to be created in response to a creation operation performed by a first user to create a digital document of title of a target asset, where the first configuration information is configuration information generated by the first user by performing a configuration operation on each component in a corresponding first document template based on related information of the target asset, and the first document template is a template that matches the related information of the target asset in a plurality of document templates corresponding to a first blockchain; if it is determined that the first configuration information satisfies a configured first configuration rule of the component, send a document creation request to a service node based on the first configuration information, so the service node generates a digital document of title based on the first configuration information and a predetermined document generation rule, and stores the digital document of title in the first blockchain, so the target asset is circulated by using the first blockchain based on the digital document of title; and display received creation result information sent by the service node.

BRIEF DESCRIPTION OF DRAWINGS

To describe the technical solutions in one or more embodiments of the present specification or in the existing technology more clearly, the following briefly introduces the accompanying drawings for describing the embodiments or the existing technology. Clearly, the accompanying drawings in the following description merely show some embodiments of the present specification, and a person of ordinary skill in the art can still derive other drawings from these accompanying drawings without creative efforts.

FIG. 15 is a thirteenth schematic flowchart illustrating a method for generating a digital document of title, according to one or more embodiments of the present specification;

DESCRIPTION OF EMBODIMENTS

To make a person skilled in the art understand the technical solutions in one or more embodiments of the present specification better, the following clearly and comprehensively describes the technical solutions in the one or more embodiments of the present specification with reference to the accompanying drawings in the one or more embodiments of the present specification. Clearly, the described embodiments are merely some but not all of the embodiments of the present specification. All other embodiments obtained by a person of ordinary skill in the art based on the one or more embodiments of the present specification without creative efforts shall fall within the protection scope of the present specification.

Figure 1:
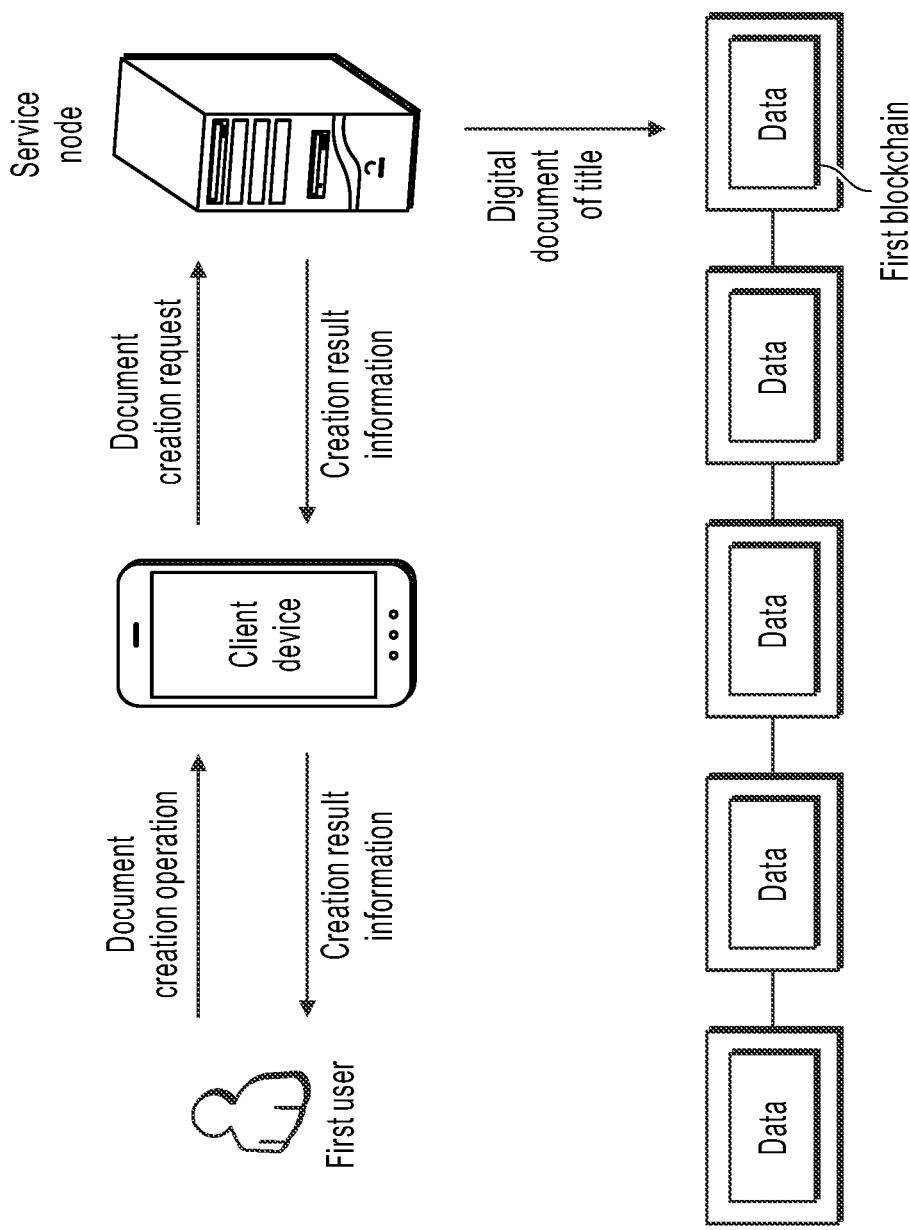
FIG. 1 is a first schematic scenario diagram illustrating a method for generating a digital document of title, according to one or more embodiments of the present specification.

FIG. 1 is a schematic diagram illustrating an application scenario of a method for generating a digital document of title, according to one or more embodiments of the present specification. As shown in FIG. 1, the scenario includes a client device, a service node, and a blockchain system including a first blockchain (only the first blockchain is shown in FIG. 1). The client device can be a mobile phone, a tablet computer, a desktop computer, a portable notebook computer, etc. (only the mobile phone is shown in FIG. 1). The service node can be an independent server, or can be a server cluster including a plurality of servers. The service node accesses the blockchain system, and can directly access the first blockchain. The first blockchain includes data of a specified type, and the data of the specified type includes a digital document of title etc.

Specifically, a first user operates a client device of the first user to create a digital document of title of a target asset. The client device obtains first configuration information of the digital document of title to be created in response to a document creation operation of the first user. The first configuration information is document information generated when the first user performs a configuration operation on each component in a corresponding first document template based on related information of the target asset. The first document template is a template that matches the related information of the target asset in a plurality of document templates corresponding to the first blockchain. If the client device determines that the obtained first configuration information satisfies a first configuration rule of a configured component, the client device sends a document creation request to the service node based on the first configuration information. The service node receives the document creation request sent by the client device, and generates a digital document of title based on the first configuration information in the document creation request and a predetermined document generation rule; and stores information such as the generated digital document of title in the first blockchain, so the corresponding target asset is circulated based on the digital document of title by using the first blockchain. The service node sends creation result information to the client device; and the client device displays the received creation result information.

Figure 2:
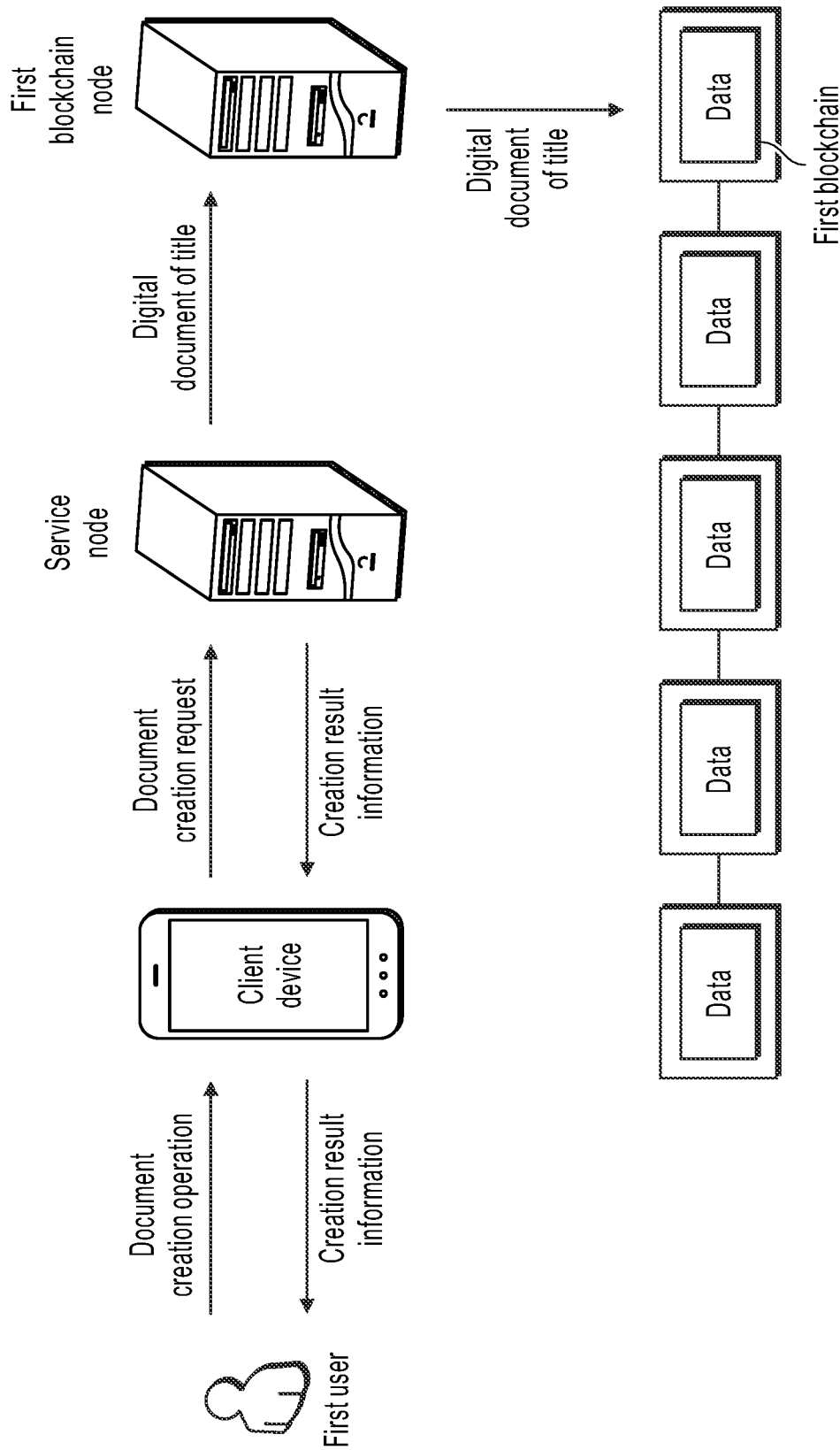
FIG. 2 is a second schematic scenario diagram illustrating a method for generating a digital document of title, according to one or more embodiments of the present specification.

Further, alternatively the service node does not need to access the blockchain system. Correspondingly, as shown in FIG. 2, the scenario further includes a first blockchain node of the blockchain system, and the first blockchain node accesses the first blockchain. Correspondingly, the service node sends the information such as the generated digital document of title to the first blockchain node, so the first blockchain node stores the information such as the digital document of title in the first blockchain.

Therefore, the service node generates the digital document of title based on the first configuration information generated by the first user by performing a configuration operation on each component in the corresponding document template based on the related information of the target asset, and stores the digital document of title in the first blockchain. As such, anchoring between the target asset in the first blockchain and the digital document of title in the first blockchain is implemented, so the corresponding target asset can be circulated by using the first blockchain based on the digital document of title. This enriches categories of assets circulated by using the first blockchain, and expands a transaction range based on the blockchain. In addition, the creation of the digital document of title is implemented based on the document template corresponding to the first blockchain, which can not only standardize the digital document of title, but also facilitate management of the digital document of title.

Figure 3:
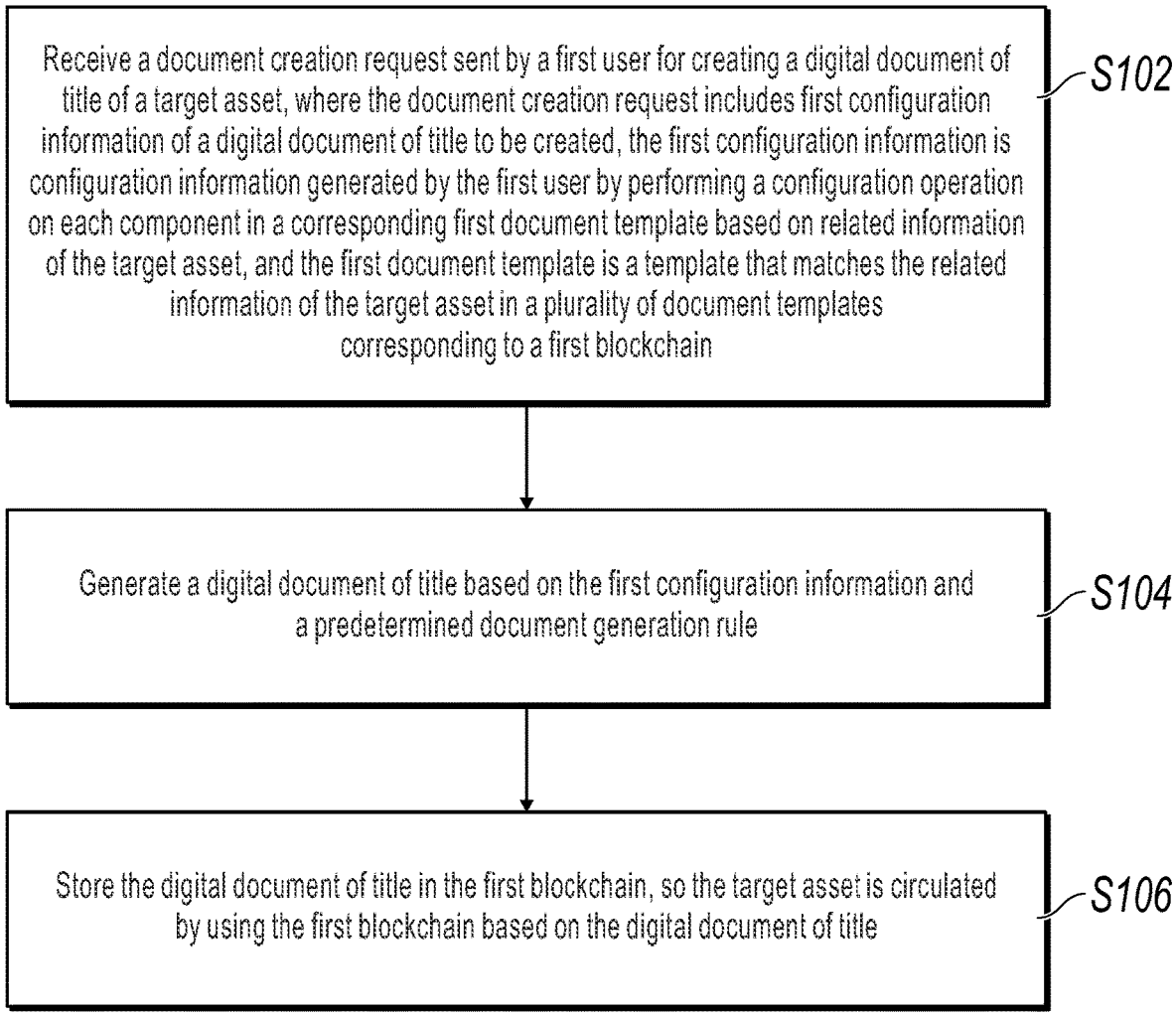
FIG. 3 is a first schematic flowchart illustrating a method for generating a digital document of title, according to one or more embodiments of the present specification.

Based on the previous application scenario architecture, one or more embodiments of the present specification provide a method for generating a digital document of title. FIG. 3 is a schematic flowchart illustrating a method for generating a digital document of title, according to one or more embodiments of the present specification. The method in FIG. 3 can be executed by the service node in FIG. 1. As shown in FIG. 3, the method includes the following steps:

Step S102: Receive a document creation request sent by a first user for creating a digital document of title of a target asset, where the document creation request includes first configuration information of a digital document of title to be created, the first configuration information is configuration information generated by the first user by performing a configuration operation on each component in a corresponding first document template based on related information of the target asset, and the first document template is a template that matches the related information of the target asset in a plurality of document templates corresponding to a first blockchain.

The first blockchain supports circulation of assets of a plurality of categories. The document templates include predetermined document templates that match the categories, and can further include a document template matching a category of the target asset and created based on a user request. When the first blockchain is a consortium blockchain, the consortium blockchain owner can further create a document template based on related regulations, and publish the document template to the first blockchain. The target asset can be an asset of the first user, or can be an asset of an enterprise that the first user belongs. The target asset can be a physical asset, such as copper, iron, and wine of a certain brand. The category of copper and iron is metal, and the category of wine of a certain brand is drinks. The target asset can also be a virtual asset, such as an option.

Generally, a user or an enterprise delivers a physical asset held by the user or the enterprise to a warehousing party for warehousing and storage, and the warehousing party issues a warehouse receipt for the user or the enterprise as a document for picking up the corresponding entity physical asset. Correspondingly, when the target asset is a physical asset, the first user can perform a configuration operation on each component in the corresponding document template based on related information such as a warehouse receipt of the physical asset, to configure information such as a warehouse receipt identifier, a warehousing party, an asset owner, the quantity of physical assets, origin, a procurement contract, and a procurement invoice.

Further, the first configuration information can be information in a form of key-value pair, that is, information in a form of Key-Value. Key is component information, such as a component name or a component identifier, and the component name can be a name specified for a corresponding component when a document template is created. For example, a component name of a certain component is a warehouse receipt identifier. Value is a value of a corresponding component configured by the user, for example, certain first configuration information is "warehouse receipt identifier—123456", which represents that a value of a component whose component name is warehouse receipt identifier is 123456. It is worthwhile to note that the form of the first configuration information is not limited to the previous key-value pair form, and can be specified based on needs in practice.

Step S104: Generate a digital document of title based on the first configuration information and a predetermined document generation rule.

Step S106: Store the digital document of title in the first blockchain, so the target asset is circulated by using the first blockchain based on the digital document of title.

The target asset is circulated by using the blockchain based on the digital document of title, that is, the target asset participates in a transaction in the first blockchain based on the digital document of title. For example, ownership of the digital document of title is changed by performing a transaction in the first blockchain, so as to change the owner of the target asset, thereby implementing circulation of the target asset between different users.

In one or more embodiments of the present specification, the service node generates the digital document of title based on the first configuration information generated by the first user by performing a configuration operation on each component in the corresponding document template based on the related information of the target asset, and stores the digital document of title in the first blockchain. As such, anchoring between the target asset in the first blockchain and the digital document of title in the first blockchain is implemented, so the corresponding target asset can be circulated by using the first blockchain based on the digital document of title. This enriches categories of assets circulated by using the first blockchain, and expands a transaction range based on the first blockchain. In addition, the creation of the digital document of title is implemented based on the document template corresponding to the first blockchain, which can not only standardize the digital document of title, but also facilitate management of the digital document of title.

Figure 4:
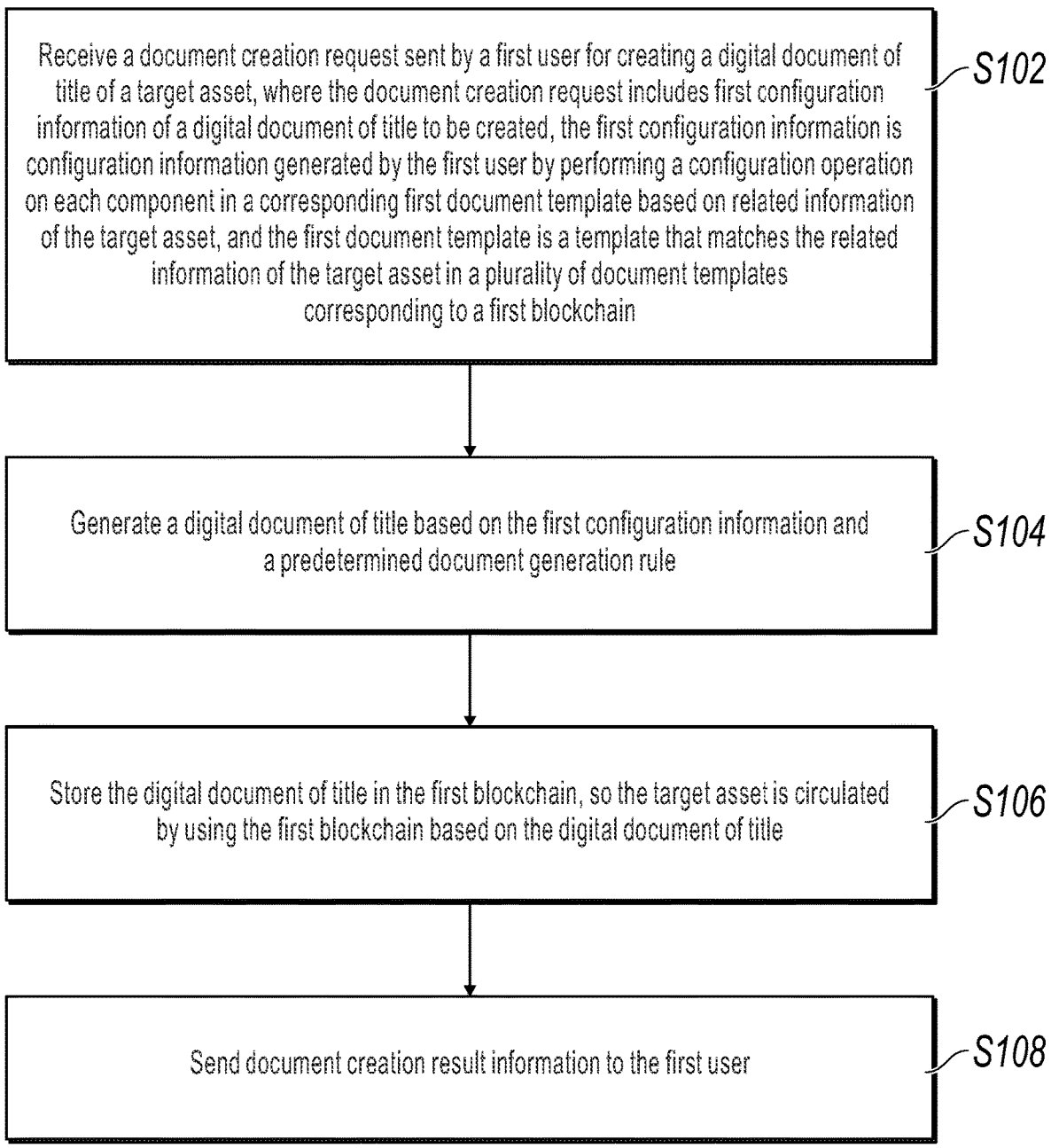
FIG. 4 is a second schematic flowchart illustrating a method for generating a digital document of title, according to one or more embodiments of the present specification.

To enable the first user to know whether the digital document of title is successfully created, as shown in FIG. 4, after step S106, the method further includes:

Step S108: Send document creation result information to the first user.

Figure 5:
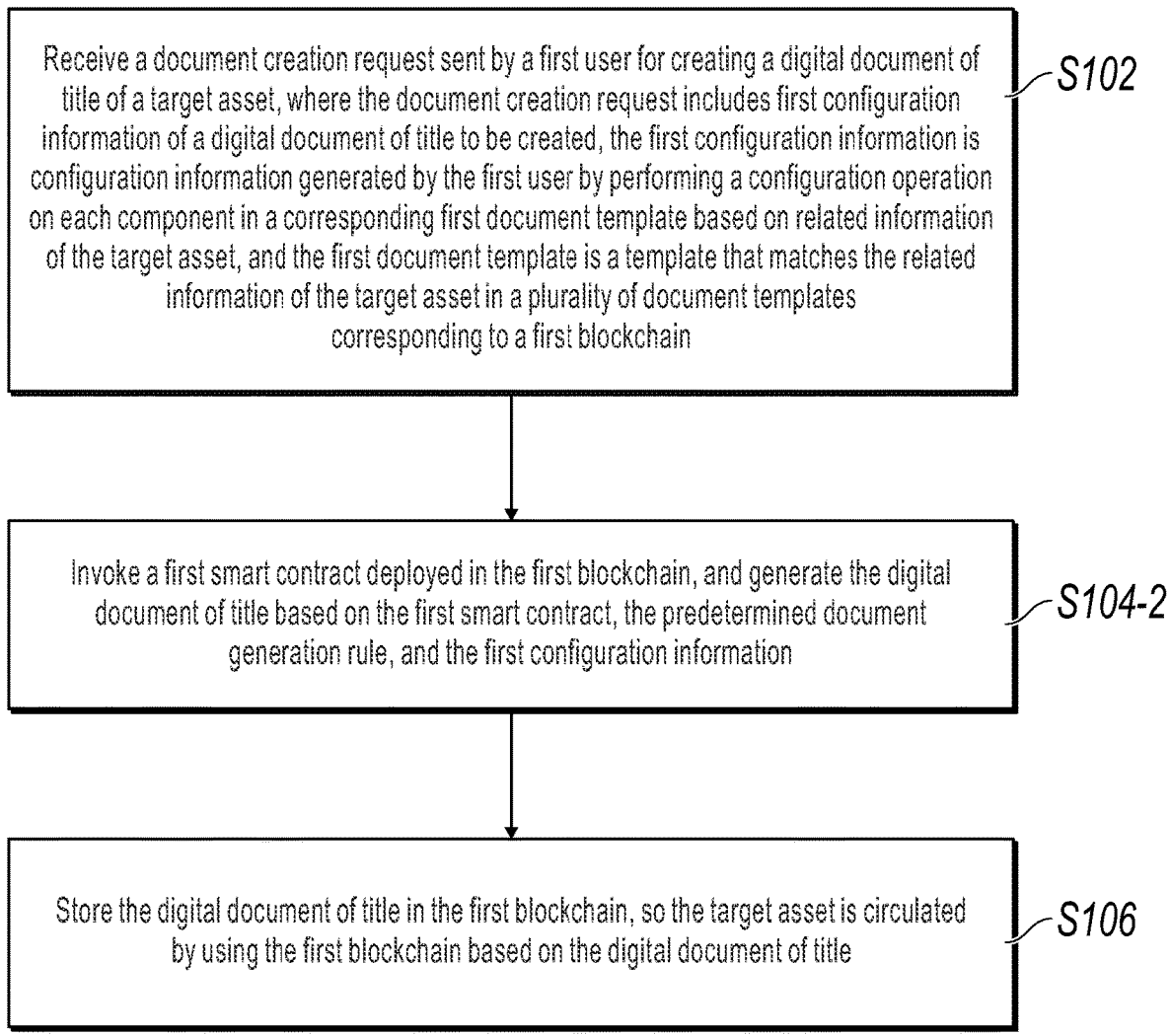
FIG. 5 is a third schematic flowchart illustrating a method for generating a digital document of title, according to one or more embodiments of the present specification.

To improve generation efficiency and accuracy of digital real right, in one or more embodiments of the present specification, the digital document of title is generated based on a smart contract. Specifically, as shown in FIG. 5, step S104 includes the following step S104-2:

Step S104-2: Invoke a first smart contract deployed in the first blockchain, and generate the digital document of title based on the first smart contract, the predetermined document generation rule, and the first configuration information.

Because the smart contract can automatically run and does not require manual participation, the digital document of title is generated by using the first smart contract, so generation efficiency and accuracy of the digital document of title can be improved, document generation rules can be flexibly configured, and personalized needs of digital documents of title of different categories of assets can be better satisfied.

Figure 6:
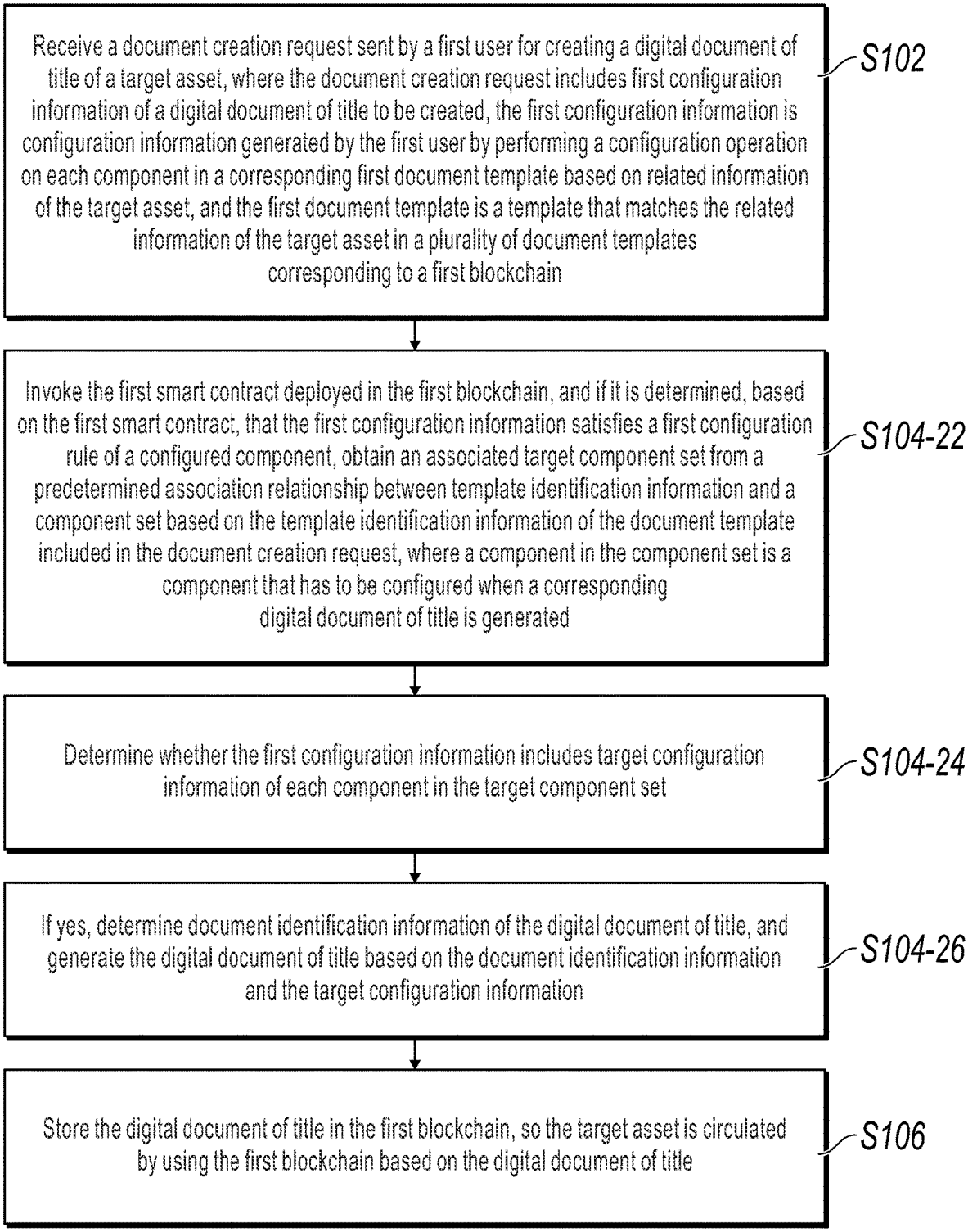
FIG. 6 is a fourth schematic flowchart illustrating a method for generating a digital document of title, according to one or more embodiments of the present specification.

To accurately determine the target asset corresponding to the digital document of title, so the target asset can be circulated, such as transferred and pledged, in one or more embodiments of the present specification, the document template includes a plurality of components, such as more than a dozen components, dozens of components, and even more components, so a user provides detailed information about the target asset. For example, the target asset is a physical asset, and the user provides corresponding warehouse receipt information (such as a warehouse receipt identifier, warehouse receipt generating time, a warehousing party, and an asset owner), asset information of the target asset (such as a category, a quantity, a total quantity, and specifications), logistics information (such as a method of transporting the target asset, a vehicle number, and driver information), bill information (such as a contract or an invoice), and storage location information (such as a warehouse number and a storage location number). However, when the digital document of title includes a large quantity of information, it is inconvenient to view the information in actual circulation, and it takes time to search for key information of the target asset. Based on this, in one or more embodiments of the present specification, a key component corresponding to the key information is predetermined. The key component is a component that has to be configured when a corresponding digital document of title is generated based on a document template. The key component forms a component set, and an association relationship between template identification information and the component set is established, so as to generate the corresponding digital document of title based on configuration information of each component in the component set. Specifically, as shown in FIG. 6, step S104-2 includes:

Step S104-22: Invoke the first smart contract deployed in the first blockchain, and if it is determined, based on the first smart contract, that the first configuration information satisfies a first configuration rule of a configured component, obtain an associated target component set from a predetermined association relationship between template identification information and a component set based on the template identification information of the document template included in the document creation request, where a component in the component set is a component that has to be configured when a corresponding digital document of title is generated.

First configuration rules of different types of components can be different, and the first configuration rule can be set when a document template is created, or can be predetermined based on industry regulations. For example, a first configuration rule of a certain component includes data configured as a text type, and when data in corresponding first configuration information is data of a character type, it is determined that the first configuration information does not satisfy the corresponding first configuration rule. For another example, if a configuration rule of a certain component includes a unit of ton, when a unit in corresponding first configuration information is kg, it is determined that the first configuration information does not satisfy the corresponding first configuration rule. Further, when it is determined that the first configuration information does not satisfy the first configuration rule of the corresponding component, document creation failure information is sent to the first user. It is worthwhile to note that when each piece of first configuration information satisfies a first configuration rule of a corresponding component, an associated target component set is obtained from a predetermined association relationship between template identification information and a component set based on template identification information of a document template included in a document creation request. Otherwise, document creation failure information is sent to the first user.

Step S104-24: Determine whether the first configuration information includes target configuration information of each component in the target component set.

Specifically, matching is performed between the component information of each component in the target component set and the component information in the first configuration information, and if the matching succeeds, the first configuration information includes the target configuration information of each component in the target component set. Otherwise, document creation failure information is sent to the client device. The component information includes a component name, a component identifier, etc. The component name can be a name specified for the corresponding component when a document template is created, for example, a component name of a certain component is a warehouse receipt identifier.

Step S104-26: If yes, determine document identification information of the digital document of title, and generate the digital document of title based on the document identification information and the target configuration information.

Optionally, the determining document identification information of the digital document of title includes: if the first configuration information includes warehouse receipt identification information, determining the warehouse receipt identification information as the document identification information of the digital document of title; or allocating the document identification information to the digital document of title based on a predetermined allocation method.

Therefore, the associated component set is obtained based on the template identification information, and the digital document of title is generated based on the target configuration information of each component in the component set included in the first configuration information, so the digital document of title can be more conveniently circulated in the blockchain based on the key information including the corresponding target asset.

Further, when the target asset is a physical asset, and an Internet of Things device (such as an intelligent camera) is installed in a warehouse where the physical asset is located, step S104-22 can further include: invoking the first smart contract deployed in the first blockchain, and obtaining video data from a corresponding Internet of Things device based on the first smart contract; and if it is determined, based on the first smart contract, that the first configuration information satisfies a first configuration rule of a configured component, and it is determined, based on the obtained video data, that a target asset matching the asset information included in the first configuration information exists, obtaining, based on the template identification information of the certificate template included in the document request, the associated target component set from the predetermined association relationship between template identification information and a component set. This ensures the authenticity of the digital document of title.

Figure 7:
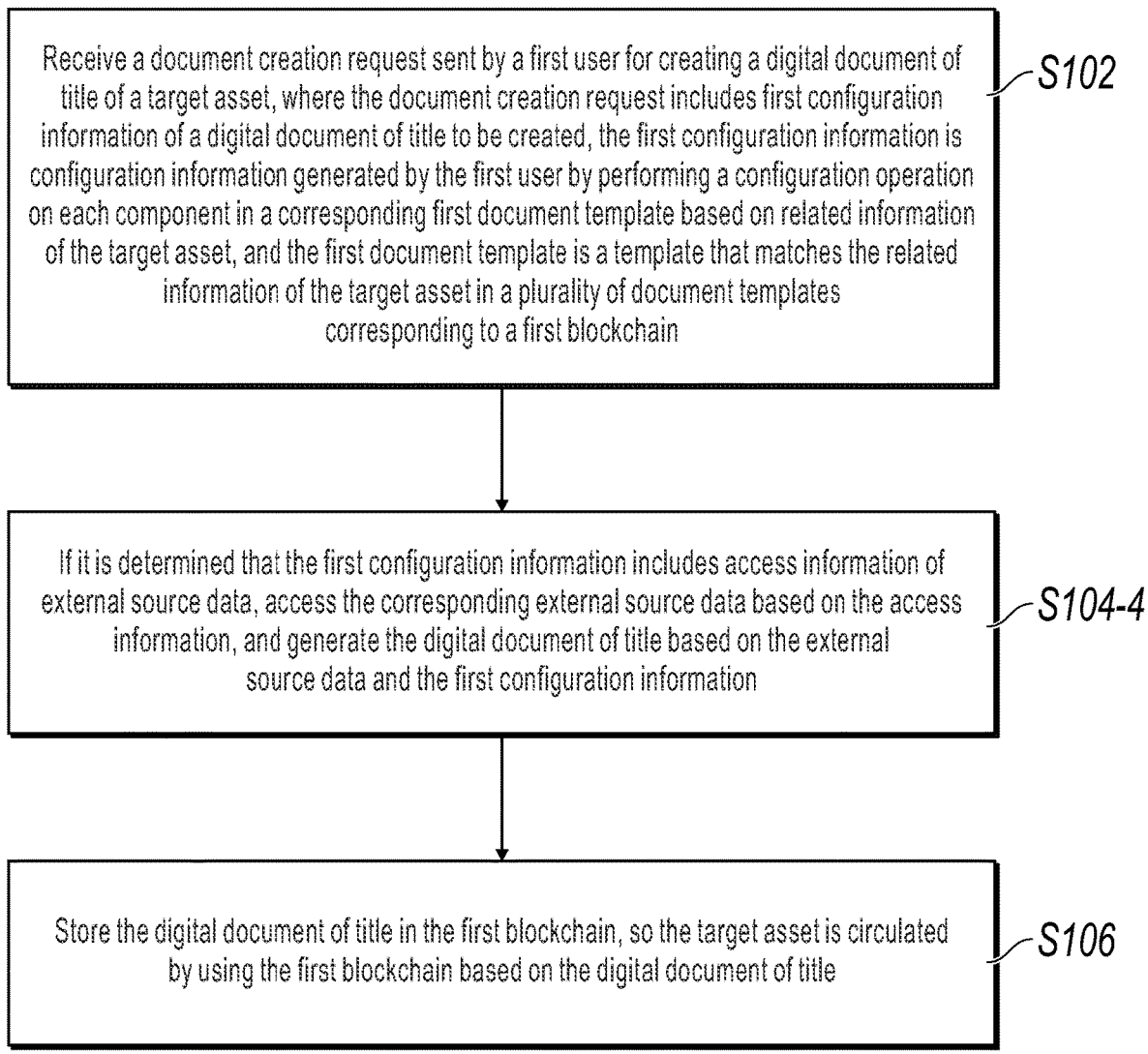
FIG. 7 is a fifth schematic flowchart illustrating a method for generating a digital document of title, according to one or more embodiments of the present specification.

Some information about the target asset is dynamically changed, for example, the target asset is plastic, an inventory quantity of the target asset decreases with sales, and one ton of the target asset may be sold when the first user performs a creation operation on the digital document of title. Therefore, to make the generated digital document of title accurate and effective, in one or more embodiments of the present specification, for dynamically changing information, when a user performs a configuration operation on a corresponding component, access information of corresponding external source data is provided, so the service node generates a digital document of title based on the latest data. Correspondingly, as shown in FIG. 7, step S104 can further include:

Step S104-4: If it is determined that the first configuration information includes access information of external source data, access the corresponding external source data based on the access information, and generate the digital document of title based on the external source data and the first configuration information.

The access information can be an access interface, a storage address, etc. of the external source data. For example, the external source data is an inventory quantity, and the access information is a storage address of the inventory quantity. The service node obtains, based on the storage address included in the first configuration information, the current inventory quantity in a storage area corresponding to the storage address, and generates the digital document of title based on the obtained inventory quantity and other first configuration information. Therefore, when some information about the target asset is dynamically changed with time, corresponding latest information is obtained by accessing the external source data, and the digital document of title is generated based on the latest information, to ensure that the digital document of title matches the status of the target asset, thereby ensuring accuracy of the digital document of title.

Figure 8:
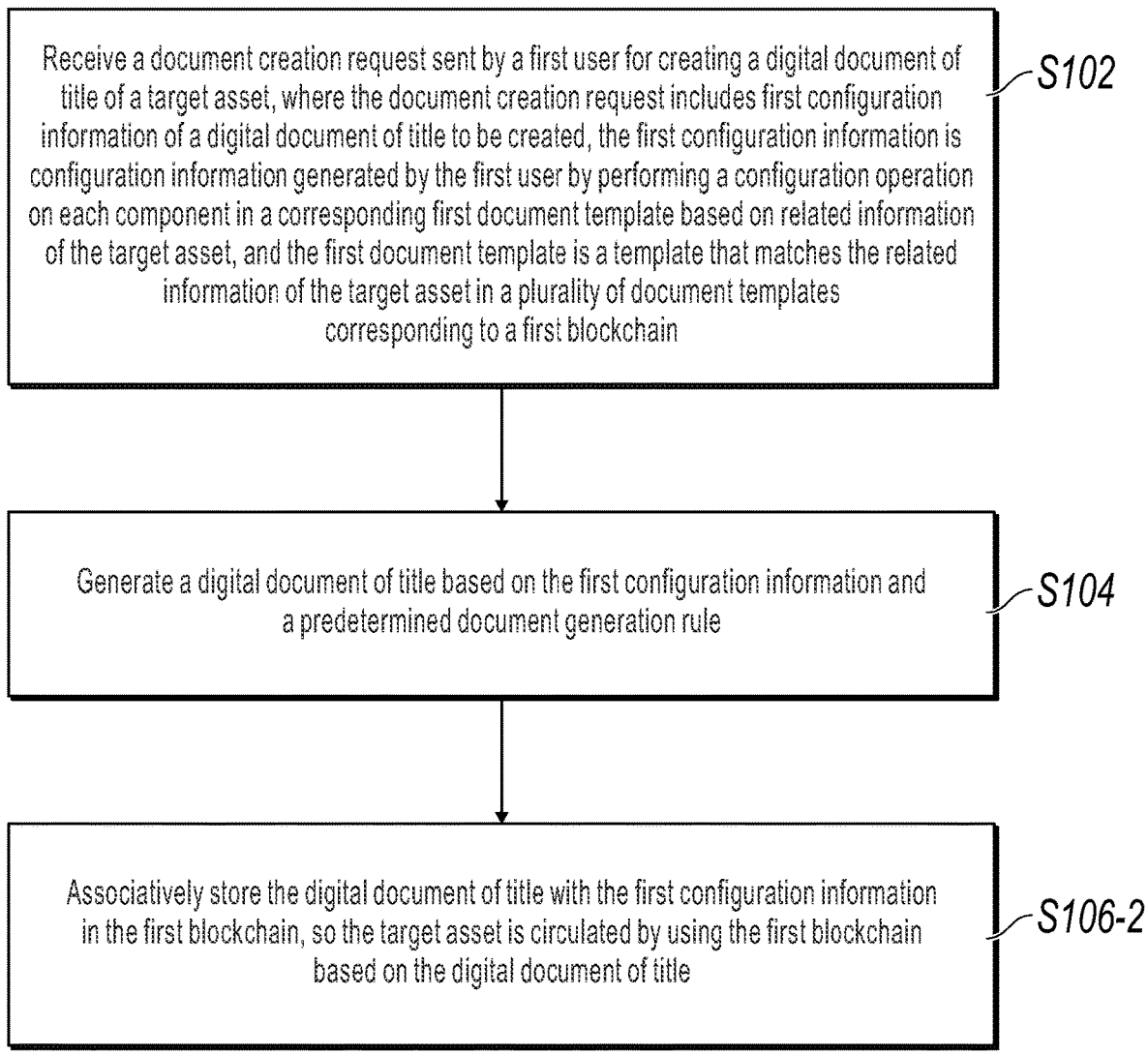
FIG. 8 is a sixth schematic flowchart illustrating a method for generating a digital document of title, according to one or more embodiments of the present specification.

As described above, the digital document of title generally includes only the key information of the corresponding target asset. To help, in a blockchain transaction, a transaction user to know detailed information of the target asset and to trace the digital document of title created by the first user, in one or more embodiments of the present specification, as shown in FIG. 8, step S106 includes the following step S106-2:

Step S106-2: Associatively store the digital document of title with the first configuration information in the first blockchain, so the target asset is circulated by using the first blockchain based on the digital document of title.

Optionally, when the first configuration information includes data of a specified type, a hash value of the data of the specified type can be calculated based on a predetermined algorithm, the calculated hash value, first configuration information excluding the data of the specified type, and digital real right information are associatively stored in the first blockchain, and the data of the specified type and the document identification information of the digital document of title are associatively stored in a specified storage area. The data of the specified type, such as a procurement contract and a detection report, needs to occupy large storage space. Or, hash values of all first configuration information are calculated based on a predetermined algorithm, the calculated hash values and digital real right information are associatively stored in the first blockchain, and the first configuration information and the document identification information of the digital document of title are associatively stored in a specified storage area. The specified storage area is a local database, cloud storage, etc. Further, to ensure information security, the first configuration information can be further encrypted based on a public key of the first user, and a ciphertext of the first configuration information and the digital document of title are associatively stored in the blockchain. In addition, when a user having access permission needs to access the first configuration information, the service node decrypts the ciphertext data of the first configuration information by using a private key corresponding to the public key of the first user, to obtain the first configuration information and send the first configuration information to the corresponding user.

Figure 9:
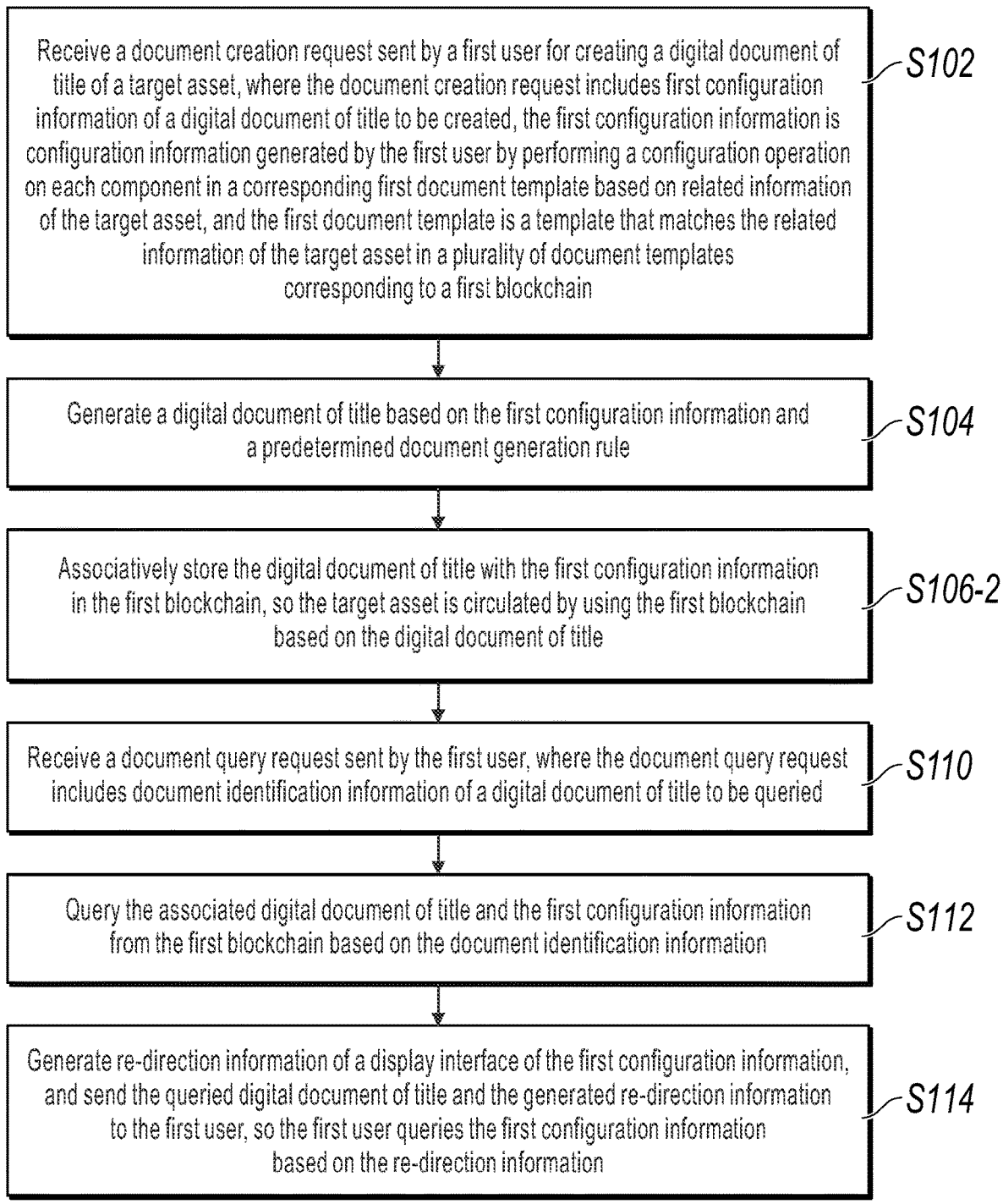
FIG. 9 is a seventh schematic flowchart illustrating a method for generating a digital document of title, according to one or more embodiments of the present specification.

Further, after the digital document of title is created, the user usually needs to query the digital document of title. Based on this, in one or more embodiments of the present specification, the user can further operate the client device to select a to-be-queried digital document of title, so the client device sends a document query request to the service node based on a query operation of the user and document identification information of the to-be-queried digital document of title. Correspondingly, as shown in FIG. 9, after step S106-2, the method further includes:

Step S110: Receive a document query request sent by the first user, where the document query request includes document identification information of a digital document of title to be queried.

Step S112: Query the associated digital document of title and the first configuration information from the first blockchain based on the document identification information.

Specifically, matching is performed between the document identification information in the document query request and the document identification information in the digital document of title in the first blockchain, a matched digital document of title is determined as the digital document of title associated with the document identification information, and the first configuration information associatively stored with the matched digital document of title is determined as the first configuration information associated with the document identification information.

Step S114: Generate re-direction information of a display interface of the first configuration information, and send the queried digital document of title and the generated re-direction information to the first user, so the first user queries the first configuration information based on the re-direction information.

Specifically, when querying the digital document of title, the user may further need to query the detailed information of the target asset corresponding to the digital document of title. In addition, the first configuration information is often relatively large. Based on this, the service node generates the re-direction information of the display interface of the first configuration information, displays the first configuration information on a separate interface, and sends the queried digital document of title information and the generated re-direction information to the client device of the first user. The digital document of title and the re-direction information sent by the service node are displayed when being received by the client device of the first user. When needing to view the detailed information of the target asset corresponding to the digital document of title information, the first user operates the re-direction information. When detecting a trigger operation of the re-direction information, the client device is re-directed to a corresponding display interface, and displays the corresponding first configuration information in the display interface. The re-direction information can be a two-dimensional code, a barcode, etc. When detecting a recognition operation performed by the first user on the two-dimensional code, the barcode, etc., the corresponding client device is re-directed to a corresponding display interface. The re-direction information can also be a link address. Correspondingly, when detecting that the first user clicks or double clicks on the link address, the client device is re-directed to a corresponding display interface.

The re-direction information of the display interface of the queried digital document of title and the corresponding first configuration information are sent to the user, so not only query of the digital document of title is implemented, but also the user can operate the re-direction information to view the detailed information of the corresponding target asset, thereby satisfying different query needs of the user and improving query experience of the user.

Figure 10:
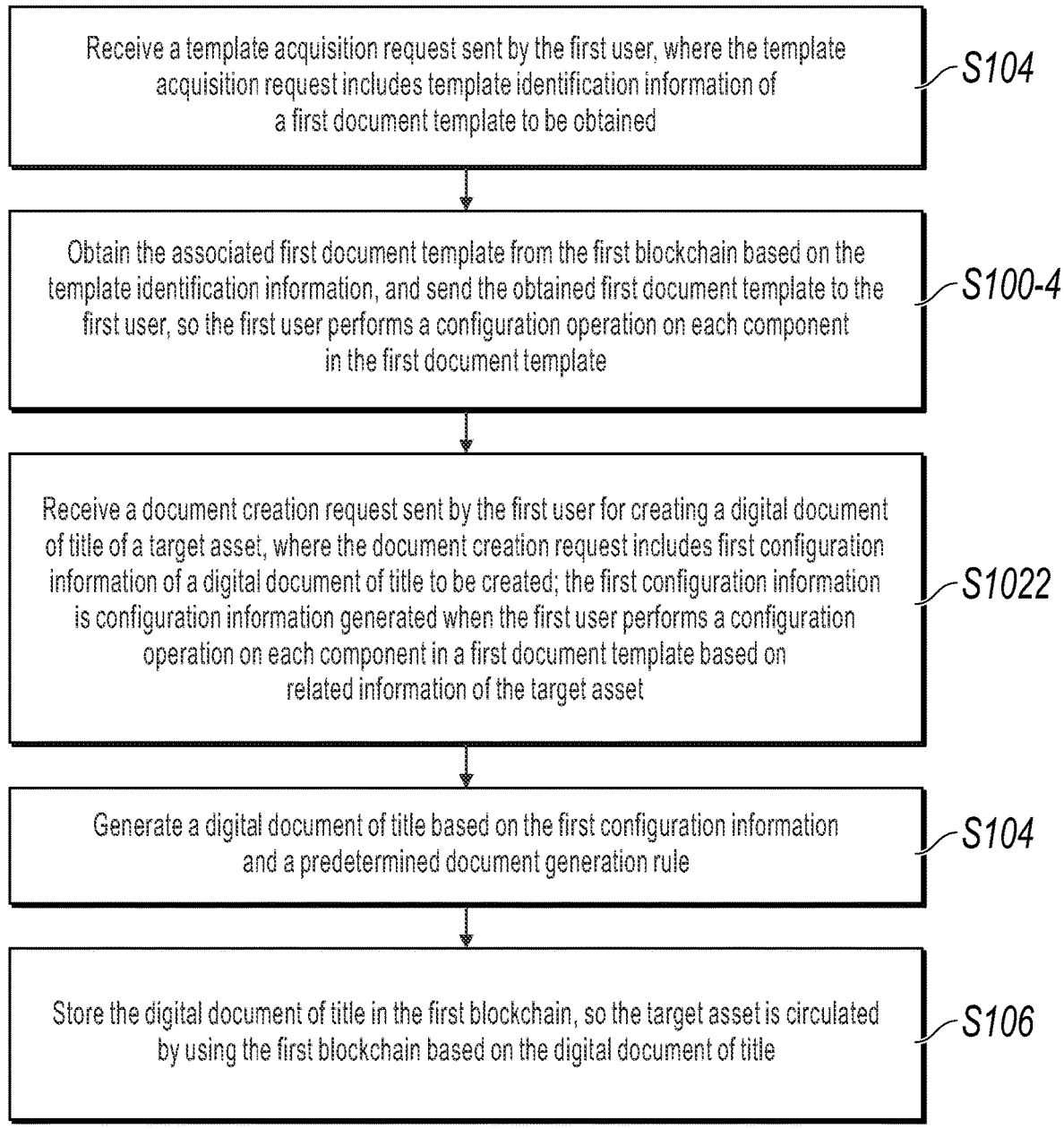
FIG. 10 is an eighth schematic flowchart illustrating a method for generating a digital document of title, according to one or more embodiments of the present specification.

To ensure validity of each document template, in one or more embodiments of the present specification, the document template and the template identification information are associatively stored in the first blockchain. Correspondingly, as shown in FIG. 10, before step S102, the method further includes:

Step S100-2: Receive a template acquisition request sent by the first user, where the template acquisition request includes template identification information of a first document template to be obtained.

Specifically, when needing to create the digital document of title, the first user selects the first document template that matches the category of the target asset based on related information of each document template displayed by the client device. The client device determines the template identification information of the first document template to be obtained based on the selection operation of the first user, and sends a template acquisition request to the service node based on the determined template identification information. The client device can display related information of a currently existing document template in a form of a display interface for the user to select, or can display the related information of the currently existing document template in a method of a drop-down menu, where the related information of the document template, such as a template name, can be specified based on needs in an actual application.

Step S100-4: Obtain the associated first document template from the first blockchain based on the template identification information, and send the obtained first document template to the first user, so the first user performs a configuration operation on each component in the first document template.

Corresponding to step S100-2 and step S100-4, as shown in FIG. 10, step S102 includes the following step S1022.

Step S1022: Receive a document creation request sent by the first user for creating a digital document of title of a target asset, where the document creation request includes first configuration information of a digital document of title to be created; the first configuration information is configuration information generated when the first user performs a configuration operation on each component in a first document template based on related information of the target asset.

Storing the document template in the blockchain can not only ensure accuracy and validity of the document template, but also facilitate management of each document template. In addition, it can be further ensured that the same document template is provided to different users for target assets of the same category, so when digital documents of title are generated, each piece of first configuration information is verified based on the same configuration rule. This can not only improve generation efficiency of the digital document of title, but also facilitate management of the digital document of title.

Figure 11:
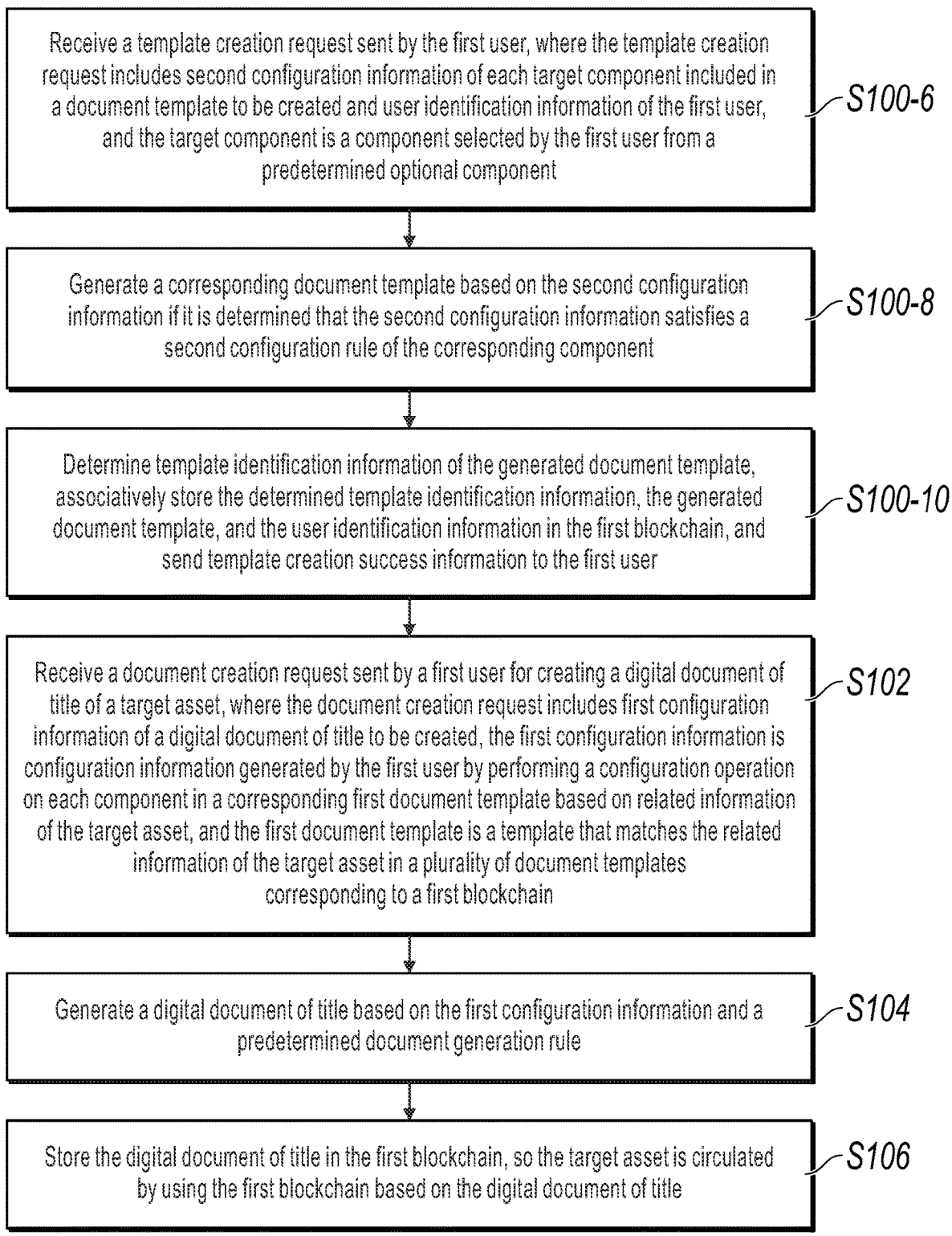
FIG. 11 is a ninth schematic flowchart illustrating a method for generating a digital document of title, according to one or more embodiments of the present specification.

Further, with continuous expansion of services, needs of a transaction party for information included in a digital document of title continuously change, and currently existing document templates may be unable to satisfy needs for creating a digital document of title. Based on this, in one or more embodiments of the present specification, when the first user determines, based on related information of each document template displayed by the client device, that no document template that matches the digital document of title to be created exists, the first user can create the document template as required. Correspondingly, as shown in FIG. 11, before step S102, the method can further include:

Step S100-6: Receive a template creation request sent by the first user, where the template creation request includes second configuration information of each target component included in a document template to be created and user identification information of the first user, and the target component is a component selected by the first user from a predetermined optional component.

The template creation request can further include a template name of the document template to be created, corresponding category information, version information of the document template, etc. Specifically, when needing to create a document template, the first user operates the client device to enter a template creation interface, set a template name and version information in the template creation interface, selects, from a plurality of pieces of predetermined category information, category information corresponding to the document template to be created, select a target component from a plurality of predetermined optional components, and configure the selected target component; and when all the target components are configured, clicks a submission control in the template creation interface. When detecting an operation performed by the first user on the submission control, the client device obtains a template name, version information, category information, and second configuration information of each target component that are set by the first user; and sends a template creation request to the service node based on the template name, the version information, the category information, the second configuration information, user identification information of the first user, etc. The document template to be created can be a first document template, or can be another document template. The second configuration information includes information in a form of a key-value pair, and the information in the form of the key-value pair represents a value configured by the first user for each component, that is, display information of each component in a document template, for example, a value of a certain input box component is a warehouse receipt identifier. The second configuration information can further include a first configuration rule of each component set by the first user, and is used to stipulate a configuration rule for a corresponding component when the user creates a digital document of title based on the document template, for example, a first configuration rule of a certain input box component includes data of an input character type.

Further, with the continuous release of different assets, there may be no category information that matches the document template to be created in the predetermined category information. In this case, the first user can further operate the client device to add new category information, and the client device sends a category addition request to the service node based on category information of a to-be-added category, the identification information of the first user, and a category addition operation of the first user. When the service node is a node in the first blockchain, the service node broadcasts a category addition request in the first blockchain. After consensus verification succeeds, a category addition record is generated based on the category information and the user identification information in the category addition request, the category addition record is stored in the first blockchain, and addition success information is sent to the first user. When the service node is not a node in the first blockchain, the service node sends a category addition request to a first blockchain node, so the first blockchain node broadcasts the category addition request in the first blockchain. After consensus verification succeeds, a category addition record is generated based on the category information and the user identification information in the category addition request, and the category addition record is stored in the first blockchain. When receiving addition success information sent by the first blockchain node, the service node sends the addition success information to the first user.

Step S100-8: Generate a corresponding document template based on the second configuration information if it is determined that the second configuration information satisfies a second configuration rule of the corresponding component.

To improve generation efficiency of a document template, in one or more embodiments of the present specification, a document template is generated based on a smart contract. Specifically, step S100-8 includes: invoking a second smart contract in the first blockchain; and generating the corresponding document template based on the second configuration information if it is determined, based on the second smart contract, that the second configuration information satisfies the second configuration rule of the target component.

Different target components may have different second configuration rules. For example, a second configuration rule of a certain drop-down selection component includes that information cannot be entered, a second configuration rule of a certain character input component includes that text data cannot be entered, and a second configuration rule of a certain text input component includes that a file cannot be uploaded. The second configuration rule of each component can be specified based on needs in practice. If it is determined that each piece of second configuration information satisfies a second configuration rule of a corresponding component, the corresponding document template is generated based on the second configuration information; otherwise, template creation failure information is sent to the first user. It is worthwhile to note that the first configuration rule and the second configuration rule can overlap, that is, include the same configuration rule.

Further, subsequently the user may update the template on the basis of the created document template. Therefore, in one or more embodiments of the present specification, document templates before and after the update are distinguished by using version information. Correspondingly, step S100-8 can include: generating the corresponding document template based on the second configuration information if it is determined, based on the second smart contract, that the second configuration information satisfies the second configuration rule of the corresponding component and version information in the template creation request is valid. Optionally, the version information is recorded in ascending order, such as V1.0, V1.1, and V1.2. Correspondingly, if it is determined that the version information in the template creation request is an initial version, it is determined that the version information is valid.

Step S100-10: Determine template identification information of the generated document template, associatively store the determined template identification information, the generated document template, and the user identification information in the first blockchain, and send template creation success information to the first user.

Specifically, the template identification information is allocated to the generated document template based on a predetermined template identification information allocation method. The allocated template identifier information, the generated certificate template, the user identifier information, the template name, the version information, and determined template creation time that are included in the template creation request, the first configuration rule included in the second configuration information, etc. are associatively stored in the first blockchain, and the template creation success information is sent to the first user. When the first user creates the digital document of title based on the created document template, the first smart contract obtains the associated first configuration rule from the first blockchain based on the template identification information in the document creation request, and determines, based on the obtained first configuration rule, whether the first configuration information satisfies the first configuration rule of the corresponding component.

It is worthwhile to note that an execution sequence of step S100-6 to step S100-10 is not limited to being prior to step S102, and can be after step S102.

Therefore, the user can personalize a component based on needs to generate a document template, so as to create a digital document of title based on the document template. It is not only flexible to create the document template, but also greatly satisfies personalized needs of digital documents of title corresponding to target assets of different industries and categories, and enriches service scenarios. Associatively storing the created document template and the user identification information is helpful to effectively manage document templates created by different users.

After creating a document template, the user usually needs to query the document template created by the user. In addition, as services continue to expand, a created document template may be unable to satisfy creation needs of a current digital document of title. Based on this, in one or more embodiments of the present specification, the user can further manage, for example, query, delete, or update, a template created by the user. Correspondingly, the method further includes:

receiving a template management request sent by the client device, where the template management request is used to request to perform at least one of a query, delete, or update operation on the document template created by using the client device; and performing corresponding processing based on the template management request, and sending processing result information to the client device.

Specifically, the template management request can be a template query request, a template deletion request, a template update request, etc. When the template management request is a template query request, the performing corresponding processing based on the template management request includes: obtaining the associatively stored document template from the first blockchain based on the user identification information of the first user included in the template query request; and sending query result information to the first user based on obtained related information of the document template. The related information of the document template is information such as template identification information, a template name, version information, and creation time of the document template. When the template management request is a template deletion request, the performing corresponding processing based on the template management request includes: if the associated certificate template is queried from the first blockchain based on the template identification information of the to-be-deleted certificate template included in the template deletion request and the user identification information of the first user, associatively storing predetermined status identification information indicating that the certificate template is in an invalid state and the queried certificate template. When the template management request is a template update request, the performing corresponding processing based on the template management request includes: obtaining template identification information and update information of a to-be-updated certificate template from the template update request; and obtaining the associated version information from the first blockchain based on the template identification information, and if it is determined, based on the obtained version information, that version information in the update information is valid and third configuration information of each component included in the update information satisfies a second configuration rule of the corresponding component, generating a new document template based on the update information, and associatively storing the template identification information in the template update request, the version information in the update information, the generated new document template, determined generation time, etc. in the first blockchain. Further, when obtaining the associated document template from the first blockchain based on the template identification information included in the template acquisition request, the service node obtains a document template of the current latest version. It is worthwhile to note that the document templates before and after the update can further correspond to different template identification information, and can be specified based on needs in an actual application.

Therefore, the user can not only configure a component based on needs to create a document template, but also query, delete, and update a created document template, which satisfies a management need of the user for the created document template.

In one or more embodiments of the present specification, the service node generates the digital document of title based on the first configuration information generated by the user by performing a configuration operation on each component in the corresponding document template based on the related information of the target asset, and stores the digital document of title in the blockchain. Therefore, anchoring between the target asset in the first blockchain and the digital document of title in the first blockchain is implemented, so the corresponding target asset can be circulated by using the first blockchain based on the digital document of title, categories of assets circulated by using the first blockchain are enriched, and a transaction range based on the first blockchain is expanded. In addition, the creation of the digital document of title is implemented based on the document template corresponding to the first blockchain, which can not only standardize the digital document of title, but also facilitate management of the digital document of title.

Figure 12:
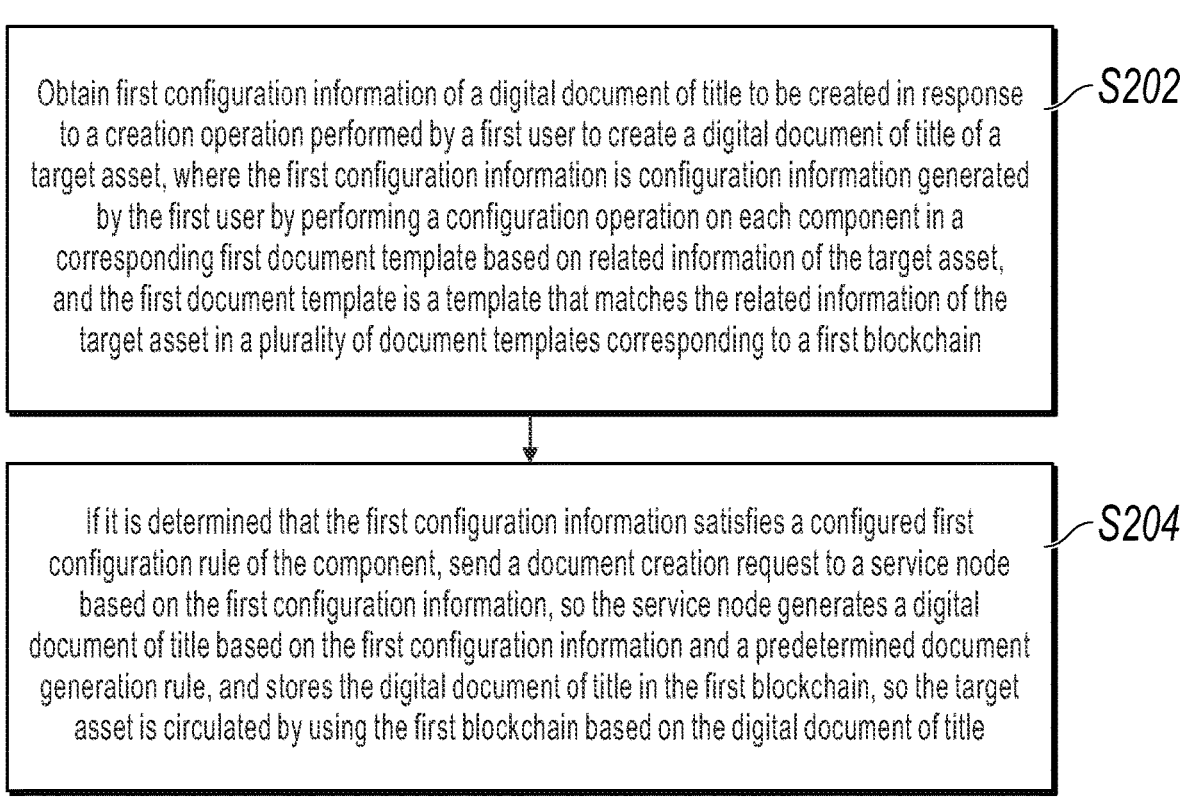
FIG. 12 is a tenth schematic flowchart illustrating a method for generating a digital document of title, according to one or more embodiments of the present specification.

Corresponding to the previous methods for generating a digital document of title described in FIG. 3 to FIG. 11, based on the same technical concept, one or more embodiments of the present specification further provide another method for generating a digital document of title. FIG. 12 is a schematic flowchart illustrating another method for generating a digital document of title, according to one or more embodiments of the present specification. The method in FIG. 12 can be executed by the client device in FIG. 1. As shown in FIG. 12, the method includes the following steps:

Step S202: Obtain first configuration information of a digital document of title to be created in response to a creation operation performed by a first user to create a digital document of title of a target asset, where the first configuration information is configuration information generated by the first user by performing a configuration operation on each component in a corresponding first document template based on related information of the target asset, and the first document template is a template that matches the related information of the target asset in a plurality of document templates corresponding to a first blockchain.

Specifically, the client device obtains, in response to the creation operation of the first user on the digital document of title, a value configured by the first user for each component in the corresponding document template, generates first configuration information in a form of a key-value pair based on component information and the obtained value of the corresponding component, and sends a document creation request to a service node based on the first configuration information.

Step S204: If it is determined that the first configuration information satisfies a configured first configuration rule of the component, send a document creation request to a service node based on the first configuration information, so the service node generates a digital document of title based on the first configuration information and a predetermined document generation rule, and stores the digital document of title in the first blockchain, so the target asset is circulated by using the first blockchain based on the digital document of title.

For a method of determining that the first configuration information satisfies the first configuration rule of the configured component, refer to the previous related description. Details are omitted here for simplicity. It is worthwhile to note that, each time one piece of first configuration information is detected, the client device can determine whether the first configuration information satisfies the first configuration rule of the corresponding component. Or, after all first configuration information is obtained, the client device can determine whether each first configuration information satisfies the first configuration rule of the corresponding component. Further, for ease of subsequent query operations, after generating the digital document of title, the service node associatively stores the digital document of title and the first configuration information in the blockchain.

In one or more embodiments of the present specification, the client device sends a document creation request to the service node based on the obtained first configuration information generated by the first user by performing a configuration operation on each component in the corresponding document template based on the related information of the target asset, so the service node generates a digital document of title based on the first configuration information, and stores the digital document of title in the first blockchain. Therefore, anchoring between the target asset in the first blockchain and the digital document of title in the first blockchain is implemented, so the corresponding target asset can be circulated by using the first blockchain based on the digital document of title, categories of assets circulated by using the first blockchain are enriched, and a transaction range based on the first blockchain is expanded. In addition, the creation of the digital document of title is implemented based on the document template corresponding to the first blockchain, which can not only standardize the digital document of title, but also facilitate management of the digital document of title.

Figure 13:
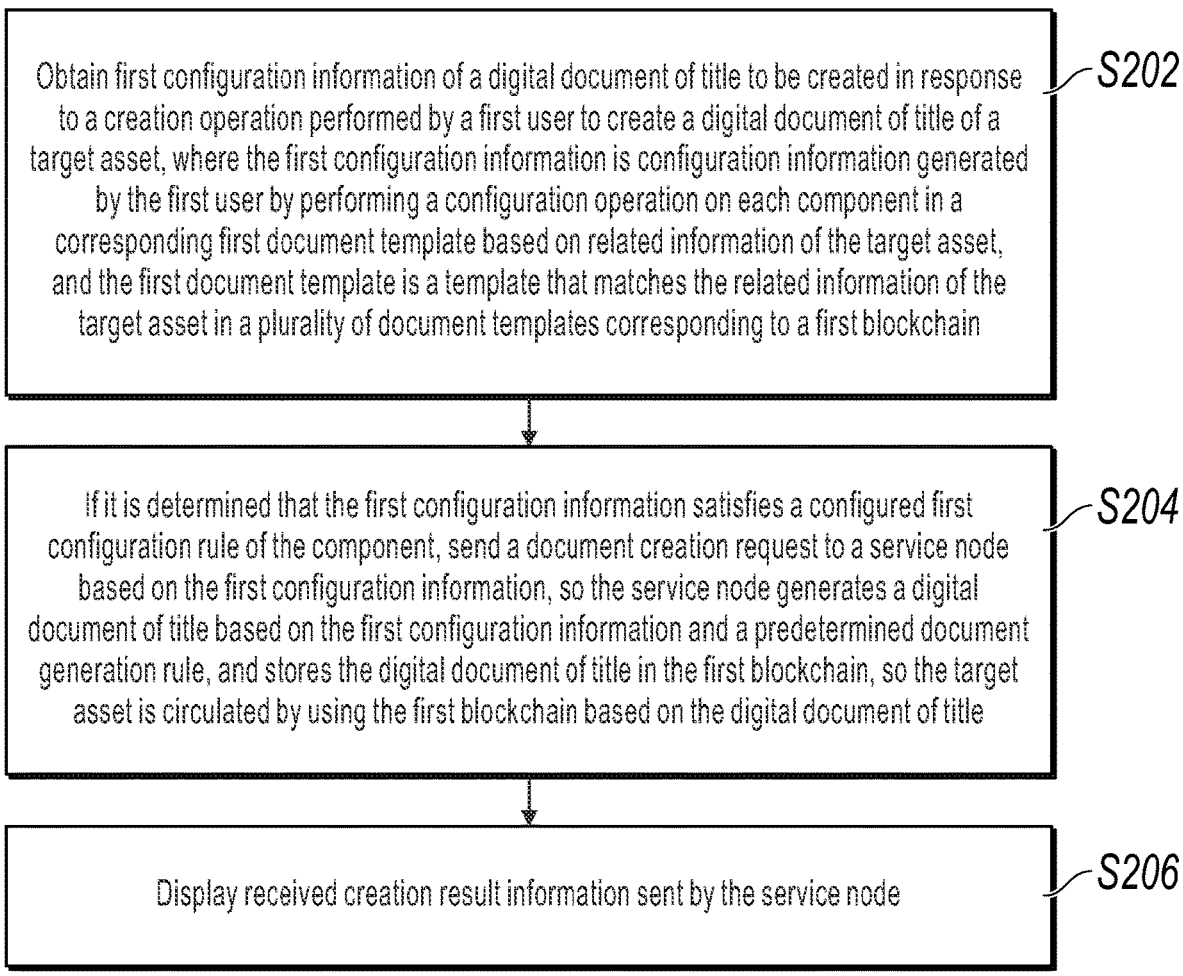
FIG. 13 is an eleventh schematic flowchart illustrating a method for generating a digital document of title, according to one or more embodiments of the present specification.

To enable the first user to know whether the digital document of title is successfully created, in one or more embodiments of the present specification, after generating the digital document of title, the service node sends document creation result information to the first user. Correspondingly, as shown in FIG. 13, after step S204, the method further includes:

Step S206: Display received creation result information sent by the service node.

Figure 14:
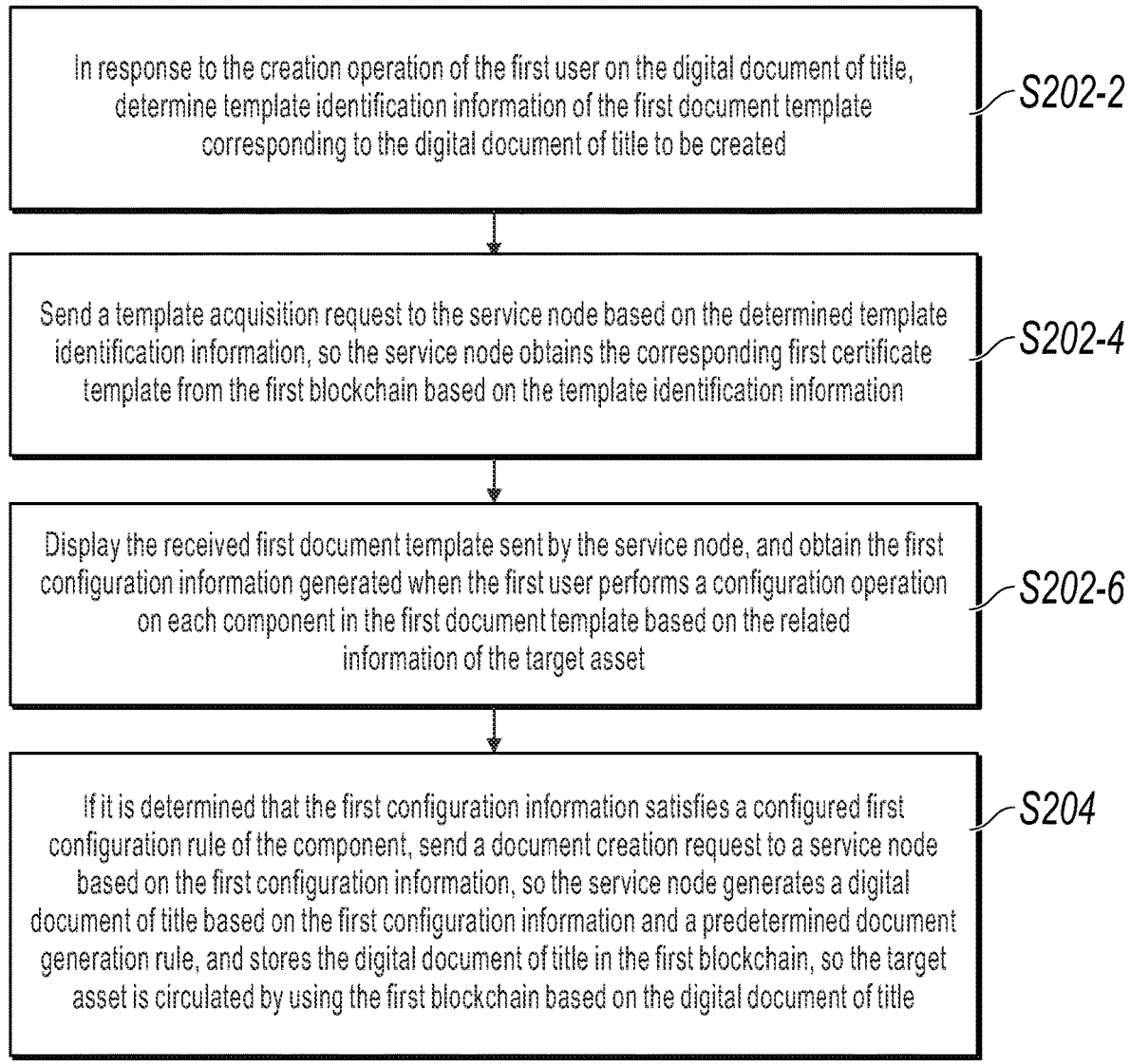
FIG. 14 is a twelfth schematic flowchart illustrating a method for generating a digital document of title, according to one or more embodiments of the present specification.

To facilitate management on a digital document of title corresponding to a target asset of each category, in one or more embodiments of the present specification, digital documents of title corresponding to target assets of the same category are created based on the same document template. To ensure validity of each document template, in one or more embodiments of the present specification, the document template and the template identification information are associatively stored in the first blockchain. Correspondingly, as shown in FIG. 14, step S202 includes:

Step S202-2: In response to the creation operation of the first user on the digital document of title, determine template identification information of the first document template corresponding to the digital document of title to be created.

Step S202-4: Send a template acquisition request to the service node based on the determined template identification information, so the service node obtains the corresponding first certificate template from the first blockchain based on the template identification information.

Step S202-6: Display the received first document template sent by the service node, and obtain the first configuration information generated when the first user performs a configuration operation on each component in the first document template based on the related information of the target asset.

After the creation of the digital document of title is completed, the user often needs to query the digital document of title. Based on this, in one or more embodiments of the present specification, as shown in FIG. 15, after step S206, the method further includes:

Step S208: Send a document query request to the service node in response to a document query operation of the first user, where the document query request includes document identification information of a digital document of title to be queried, so the service node queries the associated digital document of title and the first configuration information from the first blockchain based on the document identification information, to generate re-direction information of a display interface of the first configuration information.

Step S210: Display the received digital document of title and re-direction information sent by the service node.

It is worthwhile to note that the digital document of title and the re-direction information can be displayed on the same interface, or can be displayed on different interfaces. For example, the digital document of title and the re-direction information are displayed on different interfaces. When detecting a detailed query operation performed by the first user on the display interface of the digital document of title, the client device displays the display interface of the re-direction information.

Step S212: If a trigger operation of the re-direction information is detected, re-direct to a corresponding display interface to display the first configuration information associated with the digital document of title.

The client device displays the re-direction information of the display interface of the received digital document of title and the corresponding first configuration information, so not only query of the digital document of title is implemented, but also the user can operate the re-direction information to view the detailed information of the corresponding target asset, thereby satisfying different query needs of the user and improving query experience of the user.

Figure 16:
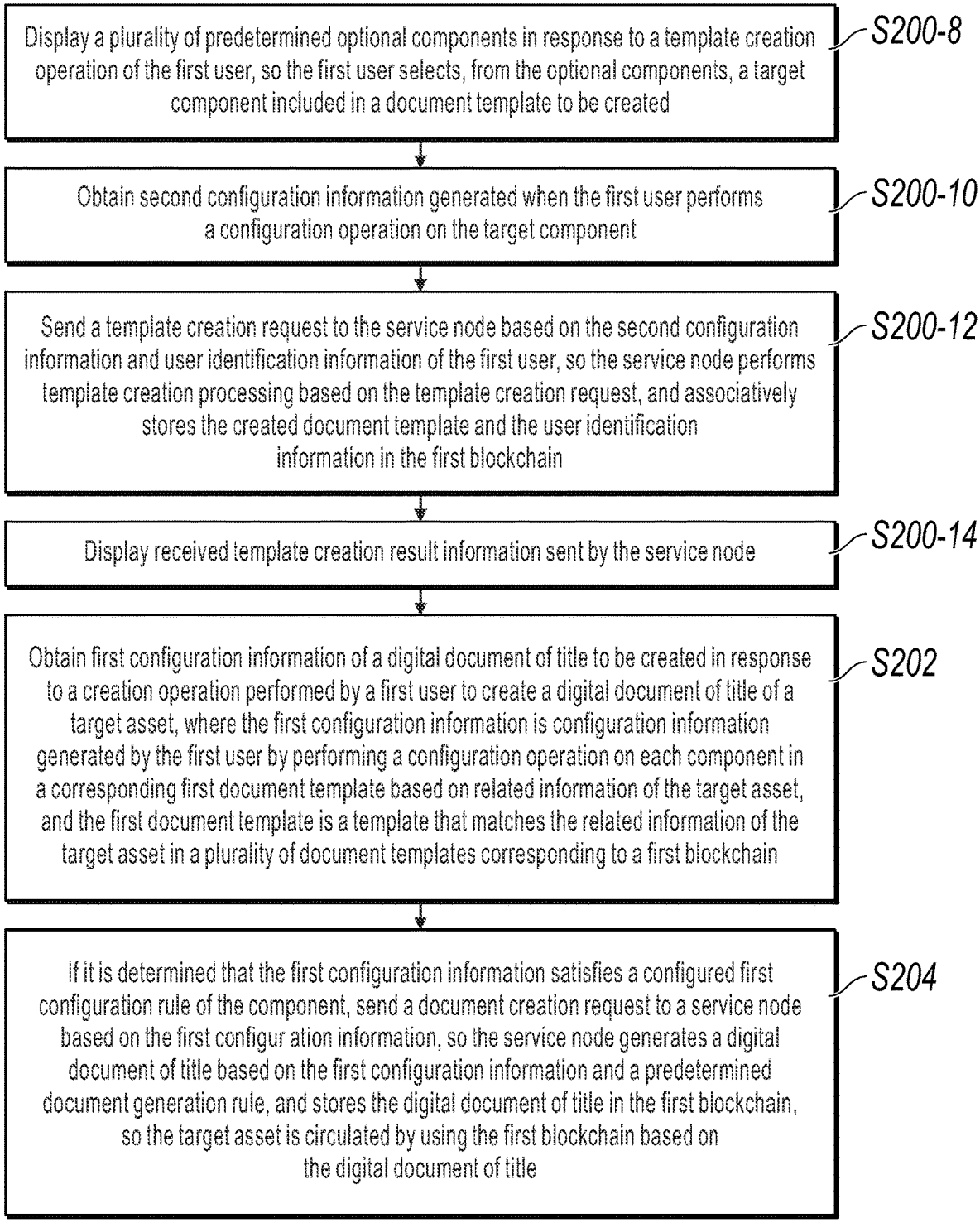
FIG. 16 is a fourteenth schematic flowchart illustrating a method for generating a digital document of title, according to one or more embodiments of the present specification.

Considering that the currently existing document template may be unable to satisfy user needs, in one or more embodiments of the present specification, as shown in FIG. 16, before step S202, the method can further include the following steps:

Step S200-8: Display a plurality of predetermined optional components in response to a template creation operation of the first user, so the first user selects, from the optional components, a target component included in a document template to be created.

The document template to be created can be a first document template, or can be another document template.

Step S200-10: Obtain second configuration information generated when the first user performs a configuration operation on the target component.

Step S200-12: Send a template creation request to the service node based on the second configuration information and user identification information of the first user, so the service node performs template creation processing based on the template creation request, and associatively stores the created document template and the user identification information in the first blockchain.

Specifically, whether the second configuration information satisfies the second configuration rule of the target component is determined. If yes, the template creation request is sent to the service node based on the second configuration information and the user identification information of the first user, so the service node performs template creation processing based on the template creation request, and associatively stores the created document template and the user identification information in the first blockchain.

Step S200-14: Display received template creation result information sent by the service node.

Therefore, the user can personalize a component based on needs to generate a document template, so as to create a digital document of title based on the document template. It is not only flexible to create the document template, but also greatly satisfies personalized needs of digital documents of title corresponding to target assets of different industries and categories, and enriches service scenarios.

Further, after creating a document template, the user usually needs to query the document template created by the user. In addition, as services continue to develop, a created document template may be unable to satisfy creation needs of a current digital document of title. Based on this, in one or more embodiments of the present specification, the method further includes:

sending a template management request to the service node in response to a template management operation of the first user, so the service node performs corresponding processing based on the template management request, and the template management request is used to request to perform at least one of a query, delete, or update operation on the document template created by the client device; and displaying received processing result information sent by the service node.

The template management request is a template query request, a template deletion request, a template update request, etc. The template query request is used to request to query each document template created by the first user. For processing performed by the service node based on different template management requests, refer to the previous related description. Details are omitted here for simplicity.

In one or more embodiments of the present specification, the client device sends a document creation request to the service node based on the obtained first configuration information generated by the user by performing a configuration operation on each component in the corresponding document template based on the related information of the target asset, so the service node generates a digital document of title based on the first configuration information, and stores the digital document of title in the blockchain. Therefore, anchoring between the target asset in the first blockchain and the digital document of title in the first blockchain is implemented, so the corresponding target asset can be circulated by using the first blockchain based on the digital document of title, categories of assets circulated by using the first blockchain are enriched, and a transaction range based on the first blockchain is expanded. In addition, the creation of the digital document of title is implemented based on the document template corresponding to the first blockchain, which can not only standardize the digital document of title, but also facilitate management of the digital document of title.

Figure 17:
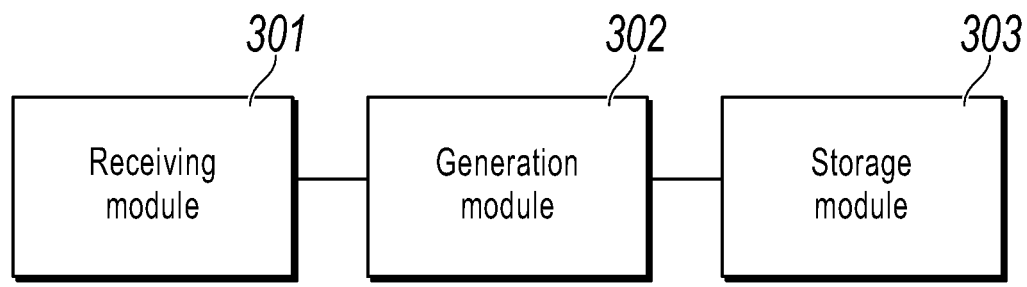
FIG. 17 is a first schematic modular composition diagram illustrating an apparatus for generating a digital document of title, according to one or more embodiments of the present specification.

Corresponding to the methods for generating a digital document of title described in FIG. 3 to FIG. 11, based on the same technical concept, one or more embodiments of the present specification further provide an apparatus for generating a digital document of title. FIG. 17 is a schematic modular composition diagram illustrating an apparatus for generating a digital document of title, according to one or more embodiments of the present specification. The apparatus is configured to execute the methods for generating a digital document of title described in FIG. 3 to FIG. 11. As shown in FIG. 17, the apparatus includes:

a receiving module 301, configured to receive a document creation request sent by a client device of a first user for creating a digital document of title of a target asset, where the document creation request includes first configuration information of a digital document of title to be created, the first configuration information is configuration information generated by the first user by performing a configuration operation on each component in a corresponding first document template based on related information of the target asset, and the first document template is a template that matches the related information of the target asset in a plurality of document templates corresponding to a first blockchain;

a generation module 302, configured to generate a digital document of title based on the first configuration information and a predetermined document generation rule; and a storage module 303, configured to store the digital document of title in the first blockchain, so the target asset is circulated by using the first blockchain based on the digital document of title.

In one or more embodiments of the present specification, the apparatus for generating a digital document of title generates the digital document of title based on the first configuration information generated by the first user by performing a configuration operation on each component in the corresponding document template based on the related information of the target asset, and stores the digital document of title in the first blockchain. As such, anchoring between the target asset in the first blockchain and the digital document of title in the first blockchain is implemented, so the corresponding target asset can be circulated by using the first blockchain based on the digital document of title. This enriches categories of assets circulated by using the first blockchain, and expands a transaction range based on the first blockchain. In addition, the creation of the digital document of title is implemented based on the document template corresponding to the first blockchain, which can not only standardize the digital document of title, but also facilitate management of the digital document of title.

Optionally, the generation module 302 is configured to: invoke a first smart contract deployed in the first blockchain, and generate the digital document of title based on the first smart contract, the predetermined document generation rule, and the first configuration information.

Optionally, the document creation request further includes template identification information of the document template.

The generation module 302 is configured to: if it is determined, based on the first smart contract, that the first configuration information satisfies a configured first configuration rule of the component, obtain an associated target component set from a predetermined association relationship between template identification information and a component set based on the template identification information, where a component in the component set is a component that has to be configured when a corresponding digital document of title is generated determine whether the first configuration information includes target configuration information of each component in the target component set; and if yes, determine document identification information of the digital document of title, and generate the digital document of title based on the document identification information and the target configuration information.

Optionally, the generation module 302 is configured to if it is determined that the first configuration information includes access information of external source data, access the external source data based on the access information, and generate the digital document of title based on the external source data and the first configuration information.

Optionally, the storage module 303 is configured to associatively store the digital document of title with the first configuration information in the first blockchain.

Optionally, the digital document of title includes document identification information. The apparatus further includes a query module, where after the storage module 302 associatively stores the digital document of title and the first configuration information in the first blockchain, the receiving module 301 is further configured to receive a document query request sent by the first user, where the document query request includes document identification information of a digital document of title to be queried;

the querying module is configured to query the associated digital document of title and the first configuration information from the first blockchain based on the document identification information;

generate re-direction information of a display interface of the first configuration information; and send the queried digital document of title and the re-direction information to the first user, so the first user queries the first configuration information based on the re-direction information.

Optionally, the apparatus further includes an acquisition module;

before receiving the document creation request sent by the first user, the receiving module 301 is further configured to receive a template acquisition request sent by the first user, where the template acquisition request includes template identification information of the first document template to be obtained;

the acquisition module is configured to obtain the associated first document template from the first blockchain based on the template identification information; and send the obtained first document template to the first user, so the first user performs a configuration operation on each component in the document template.

Optionally, the apparatus further includes a template creation module;

the receiving module 301 is configured to: further receive a template creation request sent by the first user, where the template creation request includes second configuration information of each target component included in a document template to be created and user identification information of the first user, and the target component is a component selected by the first user from a predetermined optional component;

the template creation module is configured to: if it is determined that the second configuration information satisfies a second configuration rule of the target component, generate a document template based on the second configuration information;

determine template identification information of the generated document template, and associatively store the determined template identification information, the generated document template, and the user identification information in the first blockchain; and send template creation success information to the first user.

Optionally, the template creation module is configured to invoke a second smart contract deployed in the first blockchain, and generating the document template based on the second configuration information if it is determined, based on the second smart contract, that the second configuration information satisfies the second configuration rule of the target component.

Optionally, the apparatus further includes a processing module;

the receiving module 301 is further configured to receive a template management request sent by the first user, where the template management request is used to request to perform at least one of a query, delete, or update operation on the document template created by the first user; and the processing module is configured to perform corresponding processing based on the template management request, and send processing result information to the first user.

In one or more embodiments of the present specification, the apparatus for generating a digital document of title generates the digital document of title based on the first configuration information generated by the first user by performing a configuration operation on each component in the corresponding document template based on the related information of the target asset, and stores the digital document of title in the first blockchain. As such, anchoring between the target asset in the first blockchain and the digital document of title in the first blockchain is implemented, so the corresponding target asset can be circulated by using the first blockchain based on the digital document of title. This enriches categories of assets circulated by using the first blockchain, and expands a transaction range based on the first blockchain. In addition, the creation of the digital document of title is implemented based on the document template corresponding to the first blockchain, which can not only standardize the digital document of title, but also facilitate management of the digital document of title.

It is worthwhile to note that embodiments of the apparatus for generating a digital document of title in the present specification and embodiments of the method for generating a digital document of title in the present specification are based on the same inventive concept. Therefore, for specific implementation of this embodiment, reference can be made to an embodiment of the previous method for generating a digital document of title. Details are omitted here for simplicity.

Figure 18:
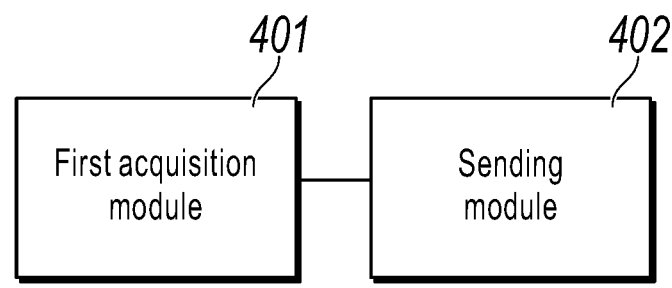
FIG. 18 is a second schematic modular composition diagram illustrating an apparatus for generating a digital document of title, according to one or more embodiments of the present specification.

Further, corresponding to the methods for generating a digital document of title described in FIG. 12 to FIG. 16, based on the same technical concept, one or more embodiments of the present specification further provide another apparatus for generating a digital document of title. FIG. 18 is a schematic modular composition diagram illustrating another apparatus for generating a digital document of title, according to one or more embodiments of the present specification. The apparatus is configured to execute the methods for generating a digital document of title described in FIG. 12 to FIG. 16. As shown in FIG. 18, the apparatus includes:

a first acquisition module 401, configured to obtain first configuration information of a digital document of title to be created in response to a creation operation performed by a first user to create a digital document of title of a target asset, where the first configuration information is configuration information generated by the first user by performing a configuration operation on each component in a corresponding first document template based on related information of the target asset, and the first document template is a template that matches the related information of the target asset in a plurality of document templates corresponding to a first blockchain; and a sending module 402, configured to: if it is determined that the first configuration information satisfies a configured first configuration rule of the component, send a document creation request to a service node based on the first configuration information, so the service node generates a digital document of title based on the first configuration information and a predetermined document generation rule, and stores the digital document of title in the first blockchain, so the target asset is circulated by using the first blockchain based on the digital document of title.

In one or more embodiments of the present specification, the apparatus for generating a digital document of title sends a document creation request to the service node based on the obtained first configuration information generated by the first user by performing a configuration operation on each component in the corresponding document template based on the related information of the target asset, so the service node generates a digital document of title based on the first configuration information, and stores the digital document of title in the first blockchain. Therefore, anchoring between the target asset in the first blockchain and the digital document of title in the first blockchain is implemented, so the corresponding target asset can be circulated by using the first blockchain based on the digital document of title, categories of assets circulated by using the first blockchain are enriched, and a transaction range based on the first blockchain is expanded. In addition, the creation of the digital document of title is implemented based on the document template corresponding to the first blockchain, which can not only standardize the digital document of title, but also facilitate management of the digital document of title.

Optionally, the apparatus further includes a determining module and a display module.

Before the first acquisition module 401 obtains the first configuration information of the digital document of title to be created, the determining module is configured to: determine template identification information of the first document template corresponding to the digital document of title;

the sending module 402 is configured to send a template acquisition request to the service node based on the template identification information, so the service node obtains the associated first document template from the first blockchain based on the template identification information; and the display module is configured to display the received first document template sent by the service node.

Optionally, the apparatus further includes a display module;

the sending module 402 is configured to send a document query request to the service node in response to a document query operation of the first user, where the document query request includes document identification information of a digital document of title to be queried, so the service node queries the associated digital document of title and the first configuration information from the first blockchain based on the document identification information, to generate re-direction information of a display interface of the first configuration information;

the display module is configured to display the received digital document of title and the re-direction information sent by the service node; and if a trigger operation of the re-direction information is detected, re-direct to the display interface to display the first configuration information.

Optionally, the display module is configured to display a plurality of predetermined optional components in response to a template creation operation of the first user, so the first user selects, from the optional components, a target component included in a document template to be created;

the second acquisition module is configured to obtain second configuration information generated when the first user performs a configuration operation on the target component;

the sending module 402 is configured to send a template creation request to the service node based on the second configuration information and user identification information of the first user, so the service node performs template creation processing based on the template creation request, and associatively stores the created document template and the user identification information in the first blockchain; and the display module is configured to display received template creation result information sent by the service node.

Optionally, the sending module 402 is configured to send a template management request to the service node in response to a template management operation of the first user, so the service node performs corresponding processing based on the template management request, and the template management request is used to request to perform at least one of a query, delete, or update operation on the document template created by the first user; and the display module is configured to display received processing result information sent by the service node.

In one or more embodiments of the present specification, the apparatus for generating a digital document of title sends a document creation request to the service node based on the obtained first configuration information generated by the first user by performing a configuration operation on each component in the corresponding document template based on the related information of the target asset, so the service node generates a digital document of title based on the first configuration information, and stores the digital document of title in the first blockchain. Therefore, anchoring between the target asset in the first blockchain and the digital document of title in the first blockchain is implemented, so the corresponding target asset can be circulated by using the first blockchain based on the digital document of title, categories of assets circulated by using the first blockchain are enriched, and a transaction range based on the first blockchain is expanded. In addition, the creation of the digital document of title is implemented based on the document template corresponding to the first blockchain, which can not only standardize the digital document of title, but also facilitate management of the digital document of title.

It is worthwhile to note that embodiments of the apparatus for generating a digital document of title in the present specification and embodiments of the method for generating a digital document of title in the present specification are based on the same inventive concept. Therefore, for specific implementation of this embodiment, reference can be made to an embodiment of the previous method for generating a digital document of title. Details are omitted here for simplicity.

Figure 19:
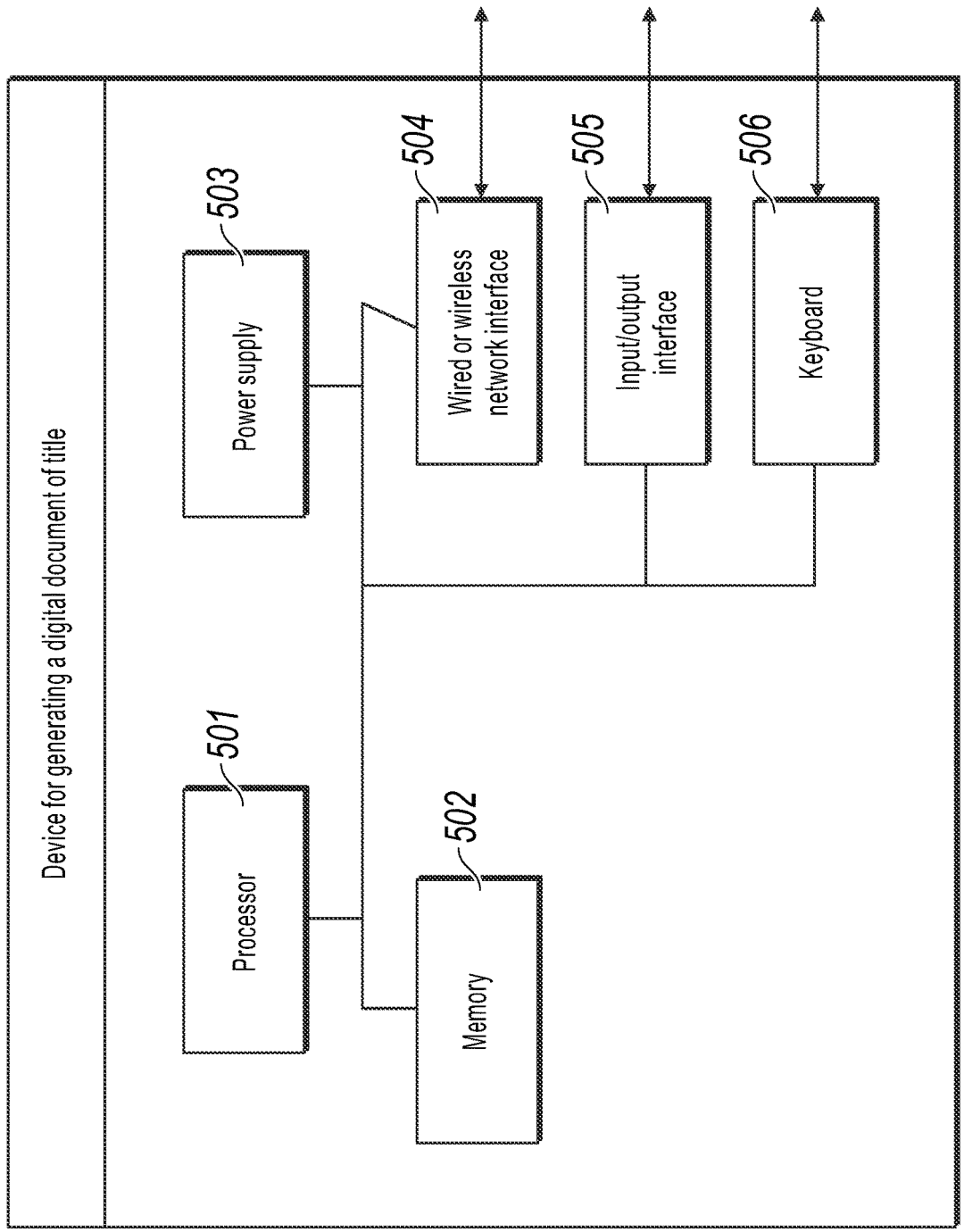
FIG. 19 is a schematic structural diagram illustrating a device for generating a digital document of title, according to one or more embodiments of the present specification.

Further, corresponding to the previous method for generating a digital document of title, based on the same technical concept, one or more embodiments of the present specification further provide a device for generating a digital document of title. The device is configured to perform the method for generating a digital document of title. FIG. 19 is a schematic structural diagram illustrating a device for generating a digital document of title, according to one or more embodiments of the present specification.

As shown in FIG. 19, the device for generating a digital document of title can vary greatly based on configuration or performance, and can include one or more processors 501 and a memory 502. The memory 502 can store one or more storage applications or data. The memory 502 can be used for transient storage or persistent storage. The applications stored in the memory 502 can include one or more modules (not shown in the figure), and each module can include a series of computer executable instructions for the device for generating a digital document of title. Further, the processor 501 can be configured to communicate with the memory 502, and execute a series of computer executable instructions in the memory 502 on the device for generating a digital document of title. The device for generating a digital document of title can further include one or more power supplies 503, one or more wired or wireless network interfaces 504, one or more input/output interfaces 505, and one or more keyboards 506.

In specific embodiments, the device for generating a digital document of title includes a memory and one or more programs. The one or more programs are stored in the memory. The one or more programs can include one or more modules. Each module can include a series of computer executable instructions for the device for generating a digital document of title. The one or more processors are configured to execute the following computer executable instructions included in the one or more programs:

receiving a document creation request sent by a first user for creating a digital document of title of a target asset, where the document creation request includes first configuration information of a digital document of title to be created, the first configuration information is configuration information generated by the first user by performing a configuration operation on each component in a corresponding first document template based on related information of the target asset, and the first document template is a template that matches the related information of the target asset in a plurality of document templates corresponding to a first blockchain;

generating a digital document of title based on the first configuration information and a predetermined document generation rule; and storing the digital document of title in the first blockchain, so the target asset is circulated by using the first blockchain based on the digital document of title.

In one or more embodiments of the present specification, the device for generating a digital document of title generates the digital document of title based on the first configuration information generated by the first user by performing a configuration operation on each component in the corresponding document template based on the related information of the target asset, and stores the digital document of title in the first blockchain. As such, anchoring between the target asset in the first blockchain and the digital document of title in the first blockchain is implemented, so the corresponding target asset can be circulated by using the first blockchain based on the digital document of title. This enriches categories of assets circulated by using the first blockchain, and expands a transaction range based on the first blockchain. In addition, the creation of the digital document of title is implemented based on the document template corresponding to the first blockchain, which can not only standardize the digital document of title, but also facilitate management of the digital document of title.

Optionally, when the computer executable instructions are executed, the generating a digital document of title based on the first configuration information and a predetermined document generation rule includes:

invoking a first smart contract deployed in the first blockchain, and generating the digital document of title based on the first smart contract, the predetermined document generation rule, and the first configuration information.

Optionally, when the computer executable instructions are executed, the document creation request further includes template identification information of the document template; and the generating the digital document of title based on the first smart contract, the predetermined document generation rule, and the first configuration information includes:

if it is determined, based on the first smart contract, that the first configuration information satisfies a configured first configuration rule of the component, obtaining an associated target component set from a predetermined association relationship between template identification information and a component set based on the template identification information, where a component in the component set is a component that has to be configured when a corresponding digital document of title is generated;

determining whether the first configuration information includes target configuration information of each component in the target component set; and if yes, determining document identification information of the digital document of title, and generating the digital document of title based on the document identification information and the target configuration information.

Optionally, when the computer executable instructions are executed, the generating a digital document of title based on the first configuration information includes:

if it is determined that the first configuration information includes access information of external source data, accessing the external source data based on the access information, and generating the digital document of title based on the external source data and the first configuration information.

Optionally, when the computer executable instructions are executed, the storing the digital document of title in the first blockchain includes:

associatively storing the digital document of title with the first configuration information in the first blockchain.

Optionally, when the computer executable instructions are executed, the digital document of title includes document identification information; and after the associatively storing the digital document of title with the first configuration information in the first blockchain, the method further includes:

receiving a document query request sent by the first user, where the document query request includes document identification information of a digital document of title to be queried;

querying the associated digital document of title and the first configuration information from the first blockchain based on the document identification information;

generating re-direction information of a display interface of the first configuration information; and sending the queried digital document of title and the re-direction information to the first user, so the first user queries the first configuration information based on the re-direction information.

Optionally, when the computer executable instructions are executed, before the receiving a document creation request sent by a first user, the method further includes:

receiving a template acquisition request sent by the first user, where the template acquisition request includes template identification information of the first document template to be obtained;

obtaining the associated first document template from the first blockchain based on the template identification information; and sending the obtained first document template to the first user, so the first user performs a configuration operation on each component in the first document template.

Optionally, when the computer executable instructions are executed, the method further includes:

receiving a template creation request sent by the first user, where the template creation request includes second configuration information of each target component included in a document template to be created and user identification information of the first user, and the target component is a component selected by the first user from a predetermined optional component;

generating a document template based on the second configuration information if it is determined that the second configuration information satisfies a second configuration rule of the target component;

determining template identification information of the generated document template, and associatively storing the determined template identification information, the generated document template, and the user identification information in the first blockchain; and sending template creation success information to the first user.

Optionally, when the computer executable instructions are executed, the generating a document template based on the second configuration information if it is determined that the second configuration information satisfies a second configuration rule of the target component includes:

invoking a second smart contract deployed in the first blockchain, and generating the document template based on the second configuration information if it is determined, based on the second smart contract, that the second configuration information satisfies the second configuration rule of the target component.

Optionally, when the computer executable instructions are executed, the method further includes:

receiving a template management request sent by the first user, where the template management request is used to request to perform at least one of a query, delete, or update operation on the document template created by the first user; and performing corresponding processing based on the template management request, and sending processing result information to the first user.

In one or more embodiments of the present specification, the device for generating a digital document of title generates the digital document of title based on the first configuration information generated by the first user by performing a configuration operation on each component in the corresponding document template based on the related information of the target asset, and stores the digital document of title in the first blockchain. As such, anchoring between the target asset in the first blockchain and the digital document of title in the first blockchain is implemented, so the corresponding target asset can be circulated by using the first blockchain based on the digital document of title. This enriches categories of assets circulated by using the first blockchain, and expands a transaction range based on the first blockchain. In addition, the creation of the digital document of title is implemented based on the document template corresponding to the first blockchain, which can not only standardize the digital document of title, but also facilitate management of the digital document of title.

In other specific embodiments, the device for generating a digital document of title includes a memory and one or more programs. The one or more programs are stored in the memory. The one or more programs can include one or more modules. Each module can include a series of computer executable instructions for the device for generating a digital document of title. The one or more processors are configured to execute the following computer executable instructions included in the one or more programs:

obtaining first configuration information of a digital document of title to be created in response to a creation operation performed by a first user to create a digital document of title of a target asset, where the first configuration information is configuration information generated by the first user by performing a configuration operation on each component in a corresponding first document template based on related information of the target asset, and the first document template is a template that matches the related information of the target asset in a plurality of document templates corresponding to a first blockchain; and if it is determined that the first configuration information satisfies a configured first configuration rule of the component, sending a document creation request to a service node based on the first configuration information, so the service node generates a digital document of title based on the first configuration information and a predetermined document generation rule, and stores the digital document of title in the first blockchain, so the target asset is circulated by using the first blockchain based on the digital document of title.

Optionally, when the computer executable instructions are executed, before the obtaining first configuration information of a digital document of title to be created, the method further includes:

determining template identification information of the first document template corresponding to the digital document of title;

sending a template acquisition request to the service node based on the template identification information, so the service node obtains the associated first document template from the first blockchain based on the template identification information; and displaying the received first document template sent by the service node.

Optionally, when the computer executable instructions are executed, the method further includes:

sending a document query request to the service node in response to a document query operation of the first user, where the document query request includes document identification information of a digital document of title to be queried, so the service node queries the associated digital document of title and the first configuration information from the first blockchain based on the document identification information, to generate re-direction information of a display interface of the first configuration information;

displaying the received digital document of title and the re-direction information sent by the service node; and if a trigger operation of the re-direction information is detected, re-directing to the display interface to display the first configuration information.

Optionally, when the computer executable instructions are executed, the method further includes:

displaying a plurality of predetermined optional components in response to a template creation operation of the first user, so the first user selects, from the optional components, a target component included in a document template to be created;

obtaining second configuration information generated when the first user performs a configuration operation on the target component;

sending a template creation request to the service node based on the second configuration information and user identification information of the first user, so the service node performs template creation processing based on the template creation request, and associatively stores the created document template and the user identification information in the first blockchain; and displaying received template creation result information sent by the service node.

Optionally, when the computer executable instructions are executed, the method further includes:

sending a template management request to the service node in response to a template management operation of the first user, so the service node performs corresponding processing based on the template management request, and the template management request is used to request to perform at least one of a query, delete, or update operation on the document template created by the first user; and displaying received processing result information sent by the service node.

In one or more embodiments of the present specification, the device for generating a digital document of title sends a document creation request to the service node based on the obtained first configuration information generated by the first user by performing a configuration operation on each component in the corresponding document template based on the related information of the target asset, so the service node generates a digital document of title based on the first configuration information, and stores the digital document of title in the first blockchain. Therefore, anchoring between the target asset in the first blockchain and the digital document of title in the first blockchain is implemented, so the corresponding target asset can be circulated by using the first blockchain based on the digital document of title, categories of assets circulated by using the first blockchain are enriched, and a transaction range based on the first blockchain is expanded. In addition, the creation of the digital document of title is implemented based on the document template corresponding to the first blockchain, which can not only standardize the digital document of title, but also facilitate management of the digital document of title.

It is worthwhile to note that embodiments of the device for generating a digital document of title in the present specification and embodiments of the method for generating a digital document of title in the present specification are based on the same inventive concept. Therefore, for specific implementation of this embodiment, reference can be made to an embodiment of the previous method for generating a digital document of title. Details are omitted here for simplicity.

Further, corresponding to the previous method for generating a digital document of title, based on the same technical concept, one or more embodiments of the present specification further provide a storage medium, configured to store computer executable instructions. In specific embodiments, the storage medium can be a USB flash drive, an optical disc, a hard disk, etc. When being executed by a processor, the computer executable instructions stored in the storage medium can implement the following procedure:

receiving a document creation request sent by a first user for creating a digital document of title of a target asset, where the document creation request includes first configuration information of a digital document of title to be created, the first configuration information is configuration information generated by the first user by performing a configuration operation on each component in a corresponding first document template based on related information of the target asset, and the first document template is a template that matches the related information of the target asset in a plurality of document templates corresponding to a first blockchain;

generating a digital document of title based on the first configuration information and a predetermined document generation rule; and storing the digital document of title in the first blockchain, so the target asset is circulated by using the first blockchain based on the digital document of title.

When the computer executable instructions stored in the storage medium provided in one or more embodiments of the present specification are executed by the processor, the digital document of title is generated based on the first configuration information generated by the first user by performing a configuration operation on each component in the corresponding document template based on the related information of the target asset, and the digital document of title is stored in the first blockchain. As such, anchoring between the target asset in the first blockchain and the digital document of title in the first blockchain is implemented, so the corresponding target asset can be circulated by using the first blockchain based on the digital document of title. This enriches categories of assets circulated by using the first blockchain, and expands a transaction range based on the first blockchain. In addition, the creation of the digital document of title is implemented based on the document template corresponding to the first blockchain, which can not only standardize the digital document of title, but also facilitate management of the digital document of title.

Optionally, when the computer executable instructions stored in the storage medium are executed by the processor, the generating a digital document of title based on the first configuration information and a predetermined document generation rule includes:

invoking a first smart contract deployed in the first blockchain, and generating the digital document of title based on the first smart contract, the predetermined document generation rule, and the first configuration information.

Optionally, when the computer executable instructions stored in the storage medium are executed by the processor, the document creation request further includes template identification information of the document template; and the generating the digital document of title based on the first smart contract, the predetermined document generation rule, and the first configuration information includes:

if it is determined, based on the first smart contract, that the first configuration information satisfies a configured first configuration rule of the component, obtaining an associated target component set from a predetermined association relationship between template identification information and a component set based on the template identification information, where a component in the component set is a component that has to be configured when a corresponding digital document of title is generated;

determining whether the first configuration information includes target configuration information of each component in the target component set; and if yes, determining document identification information of the digital document of title, and generating the digital document of title based on the document identification information and the target configuration information.

Optionally, when the computer executable instructions stored in the storage medium are executed by the processor, the generating a digital document of title based on the first configuration information includes:

if it is determined that the first configuration information includes access information of external source data, accessing the external source data based on the access information, and generating the digital document of title based on the external source data and the first configuration information.

Optionally, when the computer executable instructions stored in the storage medium are executed by the processor, the storing the digital document of title in the first blockchain includes:

associatively storing the digital document of title with the first configuration information in the first blockchain.

Optionally, when the computer executable instructions stored in the storage medium are executed by the processor, the digital document of title includes document identification information; and after the associatively storing the digital document of title with the first configuration information in the first blockchain, the method further includes:

receiving a document query request sent by the first user, where the document query request includes document identification information of a digital document of title to be queried;

querying the associated digital document of title and the first configuration information from the first blockchain based on the document identification information;

generating re-direction information of a display interface of the first configuration information; and sending the queried digital document of title and the re-direction information to the first user, so the first user queries the first configuration information based on the re-direction information.

Optionally, when the computer executable instructions stored in the storage medium are executed by the processor, before the receiving a document creation request sent by a first user, the method further includes:

receiving a template acquisition request sent by the first user, where the template acquisition request includes template identification information of the first document template to be obtained;

obtaining the associated first document template from the first blockchain based on the template identification information; and sending the obtained first document template to the first user, so the first user performs a configuration operation on each component in the first document template.

Optionally, when the computer executable instructions stored in the storage medium are executed by the processor, the method further includes:

receiving a template creation request sent by the first user, where the template creation request includes second configuration information of each target component included in a document template to be created and user identification information of the first user, and the target component is a component selected by the first user from a predetermined optional component;

generating a document template based on the second configuration information if it is determined that the second configuration information satisfies a second configuration rule of the target component;

determining template identification information of the generated document template, and associatively storing the determined template identification information, the generated document template, and the user identification information in the first blockchain; and sending template creation success information to the first user.

Optionally, when the computer executable instructions stored in the storage medium are executed by the processor, the generating a document template based on the second configuration information if it is determined that the second configuration information satisfies a second configuration rule of the target component includes:

invoking a second smart contract deployed in the first blockchain, and generating the document template based on the second configuration information if it is determined, based on the second smart contract, that the second configuration information satisfies the second configuration rule of the target component.

Optionally, when the computer executable instructions stored in the storage medium are executed by the processor, the method further includes:

receiving a template management request sent by the first user, where the template management request is used to request to perform at least one of a query, delete, or update operation on the document template created by the first user; and performing corresponding processing based on the template management request, and sending processing result information to the first user.

When the computer executable instructions stored in the storage medium provided in one or more embodiments of the present specification are executed by the processor, the digital document of title is generated based on the first configuration information generated by the first user by performing a configuration operation on each component in the corresponding document template based on the related information of the target asset, and the digital document of title is stored in the first blockchain. As such, anchoring between the target asset in the first blockchain and the digital document of title in the first blockchain is implemented, so the corresponding target asset can be circulated by using the first blockchain based on the digital document of title. This enriches categories of assets circulated by using the first blockchain, and expands a transaction range based on the first blockchain. In addition, the creation of the digital document of title is implemented based on the document template corresponding to the first blockchain, which can not only standardize the digital document of title, but also facilitate management of the digital document of title.

In other specific embodiments, the storage medium can be a USB flash drive, an optical disc, a hard disk, etc. When computer executable instructions stored in the storage medium are executed by a processor, the following procedure can be implemented:

obtaining first configuration information of a digital document of title to be created in response to a creation operation performed by a first user to create a digital document of title of a target asset, where the first configuration information is configuration information generated by the first user by performing a configuration operation on each component in a corresponding first document template based on related information of the target asset, and the first document template is a template that matches the related information of the target asset in a plurality of document templates corresponding to a first blockchain; and if it is determined that the first configuration information satisfies a configured first configuration rule of the component, sending a document creation request to a service node based on the first configuration information, so the service node generates a digital document of title based on the first configuration information and a predetermined document generation rule, and stores the digital document of title in the first blockchain, so the target asset is circulated by using the first blockchain based on the digital document of title; and displaying received creation result information sent by the service node.

Optionally, when the computer executable instructions stored in the storage medium are executed by the processor, before the obtaining first configuration information of a digital document of title to be created, the method further includes:

determining template identification information of the first document template corresponding to the digital document of title;

sending a template acquisition request to the service node based on the template identification information, so the service node obtains the associated first document template from the first blockchain based on the template identification information; and displaying the received first document template sent by the service node.

Optionally, when the computer executable instructions stored in the storage medium are executed by the processor, the method further includes:

sending a document query request to the service node in response to a document query operation of the first user, where the document query request includes document identification information of a digital document of title to be queried, so the service node queries the associated digital document of title and the first configuration information from the first blockchain based on the document identification information, to generate re-direction information of a display interface of the first configuration information;

displaying the received digital document of title and the re-direction information sent by the service node; and if a trigger operation of the re-direction information is detected, re-directing to the display interface to display the first configuration information.

Optionally, when the computer executable instructions stored in the storage medium are executed by the processor, the method further includes:

displaying a plurality of predetermined optional components in response to a template creation operation of the first user, so the first user selects, from the optional components, a target component included in a document template to be created;

obtaining second configuration information generated when the first user performs a configuration operation on the target component;

sending a template creation request to the service node based on the second configuration information and user identification information of the first user, so the service node performs template creation processing based on the template creation request, and associatively stores the created document template and the user identification information in the first blockchain; and displaying received template creation result information sent by the service node.

Optionally, when the computer executable instructions stored in the storage medium are executed by the processor, the method further includes:

sending a template management request to the service node in response to a template management operation of the first user, so the service node performs corresponding processing based on the template management request, and the template management request is used to request to perform at least one of a query, delete, or update operation on the document template created by the first user; and displaying received processing result information sent by the service node.

When the computer executable instructions stored in the storage medium provided in one or more embodiments of the present specification are executed by the processor, a document creation request is sent to the service node based on the obtained first configuration information generated by the first user by performing a configuration operation on each component in the corresponding document template based on the related information of the target asset, so the service node generates a digital document of title based on the first configuration information, and stores the digital document of title in the first blockchain. Therefore, anchoring between the target asset in the first blockchain and the digital document of title in the first blockchain is implemented, so the corresponding target asset can be circulated by using the first blockchain based on the digital document of title, categories of assets circulated by using the first blockchain are enriched, and a transaction range based on the first blockchain is expanded. In addition, the creation of the digital document of title is implemented based on the document template corresponding to the first blockchain, which can not only standardize the digital document of title, but also facilitate management of the digital document of title.

It is worthwhile to note that embodiments of the storage medium in the present specification and embodiments of the method for generating a digital document of title in the present specification are based on the same inventive concept. Therefore, for specific implementation of this embodiment, reference can be made to an embodiment of the previous cross-border payment method. Details are omitted here for simplicity.

Specific embodiments of the present specification are described above. Other embodiments fall within the scope of the appended claims. In some situations, the actions or steps described in the claims can be performed in an order different from the order in the embodiments and the desired results can still be achieved. In addition, the process depicted in the accompanying drawings does not necessarily need a particular execution order to achieve the desired results. In some implementations, multi-tasking and concurrent processing is feasible or may be advantageous.

In the 1990s, whether a technical improvement is a hardware improvement (for example, an improvement to a circuit structure, such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit chip. In addition, the programming is mostly implemented by modifying "logic compiler" software instead of manually making an integrated circuit chip. This is similar to a software compiler used for program development and compiling. However, original code before compiling is also written in a specific programming language, which is referred to as a hardware description language (HDL). There are many HDLs, such as an Advanced Boolean Expression Language (ABEL), an Altera Hardware Description Language (AHDL), Confluence, a Cornell University Programming Language (CUPL), HDCal, a Java Hardware Description Language (JHDL), Lava, Lola, MyHDL, PALASM, and a Ruby Hardware Description Language (RHDL). Currently, a Very-High-Speed Integrated Circuit Hardware Description Language (VHDL) and Verilog are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented by using any appropriate method. For example, the controller can be a microprocessor or a processor, or a computer-readable medium that stores computer readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory. A person skilled in the art also knows that, in addition to implementing the controller by using the computer readable program code, logic programming can be performed on method steps to allow the controller to implement the same function in forms of the logic gate, the switch, the application-specific integrated circuit, the programmable logic controller, and the built-in microcontroller. Therefore, the controller can be considered as a hardware component, and an apparatus configured to implement various functions in the controller can also be considered as a structure in the hardware component. Or the apparatus configured to implement various functions can even be considered as both a software module implementing the method and a structure in the hardware component.

The system, device, module, or unit illustrated in the previous embodiments can be implemented by using a computer chip or an entity, or can be implemented by using a product having a certain function. A typical implementation device is a computer. The computer can be, for example, a personal computer, a laptop computer, a cellular phone, a camera phone, a smartphone, a personal digital assistant, a media player, a navigation device, an email device, a game console, a tablet computer, or a wearable device, or a combination of any of these devices.

For ease of description, the apparatus above is described by dividing functions into various units. Certainly, when the embodiments of the present specification are implemented, a function of each unit can be implemented in one or more pieces of software and/or hardware.

A person skilled in the art should understand that one or more embodiments of the present application can be provided as a method, a system, or a computer program product. Therefore, the one or more embodiments of the present specification can use a form of hardware only embodiments, software only embodiments, or embodiments with a combination of software and hardware. Moreover, the present specification can use a form of a computer program product that is implemented on one or more computer-usable storage media (including but not limited to a disk memory, a CD-ROM, an optical memory, etc.) that include computer-usable program code.

The present specification is described with reference to the flowcharts and/or block diagrams of the method, the device (system), and the computer program product based on the embodiments of the present specification. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so the instructions executed by the computer or the processor of the another programmable data processing device generate a device for implementing a specific function in one or more processes in the flowcharts and/or in one or more blocks in the block diagrams.

These computer program instructions can be stored in a computer readable memory that can instruct the computer or the another programmable data processing device to work in a specific way, so the instructions stored in the computer readable memory generate an artifact that includes an instruction apparatus. The instruction apparatus implements a specific function in one or more processes in the flowcharts and/or in one or more blocks in the block diagrams.

These computer program instructions can be loaded onto the computer or another programmable data processing device, so a series of operations and operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more central processing units (CPUs), input/output interfaces, network interfaces, and memories.

The memory may include a non-persistent memory, a random access memory (RAM), and/or a non-volatile memory in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of the computer storage medium include but are not limited to a phase change random access memory (PRAM), a static RAM (SRAM), a dynamic RAM (DRAM), a RAM of another type, a read-only memory (ROM), an electrically erasable programmable ROM (EEPROM), a flash memory or another memory technology, a compact disc ROM (CD-ROM), a digital versatile disc (DVD), or another optical storage, a cassette, a cassette magnetic disk storage, or another magnetic storage device or any other non-transmission medium. The computer storage medium can be configured to store information that can be accessed by a computing device. As described in the present application, the computer readable medium does not include computer readable transitory media such as a modulated data signal and a carrier.

It is worthwhile to further note that, the terms "include", "contain", or their any other variants are intended to cover a non-exclusive inclusion, so a process, a method, a product or a device that includes a list of elements not only includes those elements but also includes other elements which are not expressly listed, or further includes elements inherent to such process, method, product or device. Without more constraints, an element preceded by "includes a . . . " does not preclude the existence of additional identical elements in the process, method, product or device that includes the element.

The one or more embodiments of the present specification can be described in common contexts of computer executable instructions executed by a computer, such as a program module. Generally, the program module includes a routine, a program, an object, a component, a data structure, etc. executing a specific task or implementing a specific abstract data type. The one or more embodiments of the present specification can also be practiced in distributed computing environments. In the distributed computing environments, tasks are performed by remote processing devices that are connected through a communications network. In a distributed computing environment, the program module can be located in both local and remote computer storage media including storage devices.

The embodiments in the present specification are described in a progressive way. For same or similar parts of the embodiments, references can be made to the embodiments. Each embodiment focuses on a difference from other embodiments. Particularly, a system embodiment is similar to a method embodiment, and therefore is described briefly. For related parts, references can be made to related descriptions in the method embodiment.

The previous description is merely embodiments of the present specification, and is not intended to limit the present specification. A person skilled in the art can make various modifications and changes to the present specification. Any modification, equivalent replacement, or improvement made without departing from the spirit and principle of the present specification shall fall within the scope of the claims of the present specification.

The invention claimed is:

1. A computer-implemented method performed at a service node, comprising:
receiving document creation request sent by a first user device, the document creation request for creating a digital document of title of a target asset, wherein receiving the document creation request comprises:
receiving first configuration information of the digital document of title to be created;
identifying a category of the target asset;
selecting a corresponding first document template that is associated with the category of the target asset, wherein the digital document of title and the target asset are in the same category, and the first configuration information is configuration information generated by the first user device by performing a configuration operation on each component in the corresponding first document template based on related information of the target asset, wherein the corresponding first document template is a template that matches the related information of the target asset in a plurality of document templates corresponding to a first blockchain;
generating the digital document of title based on the first configuration information and a predetermined document generation rule;
storing the digital document of title in the first blockchain;
connecting the target asset with the digital document of title in the first blockchain;
circulating the target asset by using the first blockchain based on the digital document of title;
receiving, from the first user device, a document query request for the digital document of title, wherein the document query request comprises document identification information of a to-be-queried digital document of title;
matching the document identification of the to-be-queried digital document of title with document identification information of the digital document of title stored in the first blockchain; and
in response to that the document identification of the to-be-queried digital document of title matches with the document identification information of the digital document of title stored in the first blockchain, sending, to the first user device, re-direction information and the digital document of title, wherein the re-direction information, when selected at the first user device, redirects the first user device to a corresponding display interface that displays the first configuration information.

2. The method according to claim 1, wherein generating the digital document of title based on the first configuration information and the predetermined document generation rule comprises:
invoking a first smart contract deployed in the first blockchain; and
generating the digital document of title based on the first smart contract, the predetermined document generation rule, and the first configuration information.

3. The method according to claim 2, wherein the document creation request further comprises template identification information of the corresponding first document template; and
the generating the digital document of title based on the first smart contract, the predetermined document generation rule, and the first configuration information comprises:
when determined, based on the first smart contract, that the first configuration information satisfies a configured first configuration rule of the component:
obtaining an associated target component set from a predetermined association relationship between the template identification information and a component set based on the template identification information, wherein a component in the component set has to be configured when a corresponding digital document of title is generated;
determining whether the first configuration information comprises target configuration information of each component in the associated target component set; and
when the first configuration information is determined to comprise the target configuration information of each component in the associated target component set, determining the document identification information of the digital document of title and generating the digital document of title based on the document identification information of the digital document of title and the target configuration information.

4. The method according to claim 1, wherein generating the digital document of title based on the first configuration information and the predetermined document generation rule comprises:
when it is determined that the first configuration information comprises access information of external source data:
accessing the external source data based on the access information; and
generating the digital document of title based on the external source data and the first configuration information.

5. The method according to claim 1, wherein the storing the digital document of title in the first blockchain comprises:
associatively storing the digital document of title with the first configuration information in the first blockchain.

6. The method according to claim 5, wherein the method further comprises:
after the associatively storing the digital document of title with the first configuration information in the first blockchain:
querying the associated digital document of title and the first configuration information from the first blockchain based on the document identification information;
generating the re-direction information of the corresponding display interface of the first configuration information; and
sending the queried digital document of title and the re-direction information to the first user device to query the first configuration information based on the re-direction information.

7. The method according to claim 1, further comprising:
receiving a template acquisition request sent by the first user device, wherein the template acquisition request comprises template identification information of the corresponding first document template to be obtained;
obtaining the corresponding first document template from the first blockchain based on the template identification information; and
sending the obtained first document template to the first user device to enable the first user device to perform the configuration operation on each component in the corresponding first document template.

8. The method according to claim 1, further comprising:
receiving a template creation request sent by the first user device, wherein the template creation request comprises second configuration information of each target component comprised in a document template to be created and user identification information of the first user device, and the target component is a component selected by the first user device from a predetermined optional component;
generating a document template based on the second configuration information in response to determining that the second configuration information satisfies a second configuration rule of the target component;
determining template identification information of the generated document template, and associatively storing the determined template identification information, the generated document template, and the user identification information in the first blockchain; and
sending template creation success information to the first user device.

9. The method according to claim 8, wherein generating the document template based on the second configuration information comprises:
invoking a second smart contract deployed in the first blockchain; and
generating the document template based on the second configuration information if it is determined, based on the second smart contract, that the second configuration information satisfies the second configuration rule of the target component.

10. The method according to claim 9, further comprising:
receiving a template management request sent by the first user device, wherein the template management request is used to request to perform at least one of a query, delete, or update operation on the document template created by the first user device; and
performing corresponding processing based on the template management request, and sending processing result information to the first user device.

11. A non-transitory, computer-readable medium storing one or more instructions executable by a computer system to realize a service node and perform operations comprising:
receiving document creation request sent by a first user device, the document creation request for creating a digital document of title of a target asset, wherein receiving the document creation request comprises:

receiving first configuration information of the digital document of title to be created;

identifying a category of the target asset;

selecting a corresponding first document template that is associated with the category of the target asset, wherein the digital document of title and the target asset are in the same category, and the first configuration information is configuration information generated by the first user device by performing a configuration operation on each component in the corresponding first document template based on related information of the target asset, wherein the corresponding first document template is a template that matches the related information of the target asset in a plurality of document templates corresponding to a first blockchain;

generating the digital document of title based on the first configuration information and a predetermined document generation rule;

storing the digital document of title in the first blockchain;

connecting the target asset with the digital document of title in the first blockchain;

circulating the target asset by using the first blockchain based on the digital document of title;

receiving, from the first user device, a document query request for the digital document of title, wherein the document query request comprises document identification information of a to-be-queried digital document of title;

matching the document identification of the to-be-queried digital document of title with document identification information of the digital document of title stored in the first blockchain; and in response to that the document identification of the to-be-queried digital document of title matches with the document identification information of the digital document of title stored in the first blockchain, sending, to the first user device, re-direction information and the digital document of title, wherein the re-direction information, when selected at the first user device, redirects the first user device to a corresponding display interface that displays the first configuration information.

12. The non-transitory, computer-readable medium of claim 11, the operations further comprising:

receiving a template acquisition request sent by the first user device, wherein the template acquisition request comprises template identification information of the corresponding first document template to be obtained;

obtaining the corresponding first document template from the first blockchain based on the template identification information; and sending the obtained first document template to the first user device to enable the first user device to perform the configuration operation on each component in the corresponding first document template.

* * * * *